(12) United States Patent
Ishihara

(10) Patent No.: US 6,792,828 B2
(45) Date of Patent: Sep. 21, 2004

(54) PRESS DIE FOR MOLDING SIPE BLADE AND METHOD OF MAKING THE PRESS DIE

(75) Inventor: Yasuyuki Ishihara, Toukai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/078,134

(22) Filed: Feb. 19, 2002

(65) Prior Publication Data

US 2002/0139164 A1 Oct. 3, 2002

(30) Foreign Application Priority Data

Mar. 27, 2001 (JP) ........................................ 2001-091447
Oct. 12, 2001 (JP) ........................................ 2001-315662

(51) Int. Cl.[7] .............................................. B21D 37/20
(52) U.S. Cl. ...................................................... 76/107.1
(58) Field of Search ........................... 76/101.1, 107.1; 29/515; 72/286; 425/28.1

(56) References Cited

U.S. PATENT DOCUMENTS

| | | | | |
|---|---|---|---|---|
| 2,224,337 A | * | 12/1940 | Bostwick | 29/515 |
| 2,388,528 A | * | 11/1945 | Curtiss, Jr. | 76/107.1 |
| 2,736,924 A | * | 3/1956 | Bean | 425/28.1 |
| 2,763,924 A | | 9/1956 | Bellometti | |
| 2,848,910 A | * | 8/1958 | Bastian | 76/107.1 |
| 3,327,570 A | * | 6/1967 | McClarran | 76/107.1 |
| 3,343,430 A | * | 9/1967 | Haas et al. | 76/107.1 |
| 3,581,535 A | | 6/1971 | Hinks et al. | |
| 3,608,602 A | | 9/1971 | Youngblood | |
| 3,696,655 A | | 10/1972 | Hinks et al. | |
| 4,987,799 A | * | 1/1991 | Soth | 76/107.1 |
| 5,813,276 A | * | 9/1998 | Maeda | 76/107.1 |
| 5,964,118 A | * | 10/1999 | Kamata | 72/286 |
| 6,196,818 B1 | * | 3/2001 | Coleman et al. | 425/28.1 |

FOREIGN PATENT DOCUMENTS

| | | |
|---|---|---|
| DE | 19856950 | 6/2000 |
| JP | 11-78432 | 3/1999 |
| JP | 11202009 | 7/1999 |
| JP | 2001-1722 | 1/2001 |
| JP | 2001-25831 | 1/2001 |
| JP | 2002-96200 | * 4/2002 |
| JP | 2002-321223 | * 11/2002 |
| JP | 2002-337147 | * 11/2002 |

* cited by examiner

*Primary Examiner*—Hwei-Siu Payer
(74) *Attorney, Agent, or Firm*—Burr & Brown

(57) ABSTRACT

A press die for molding a sipe blade is provided, including a pair of divided parts. A material for the sipe blade is interposed and pressed between the pair of divided parts to mold a sipe blade. Portions of the divided parts of the press die to which a load is applied by molding pressure in contact with the material to give a desired shape to the sipe blade have shapes corresponding to the desired shape of the sipe blade, and portions of the divided parts of the press die to which a load is not applied are provided with first relief parts which do not correspond to the desired shape of the sipe blade and do not substantially contact the molded sipe blade. A press die 10 for molding a sipe blade is composed of a pair of divided parts composing a press die 1 and 2, and a material 3 for the sipe blade is interposed and pressed between the pair of divided parts to mold a sipe blade 4 and is characterized in that portions 1*a* and 2*a* to which is applied a load caused by a molding pressure in contact with the material 3 for giving a desired shape to the sipe blade 4 have the shapes corresponding to a desired shape of the sipe blade 4, and portions 1*b* and 2*b* to which is not applied a load caused by molding pressure without contacting with the material 3 are provided with first relief parts 5 which do not correspond to the desired shape of the sipe blade 4 and do not substantially contact with the sipe blade after molded.

15 Claims, 46 Drawing Sheets

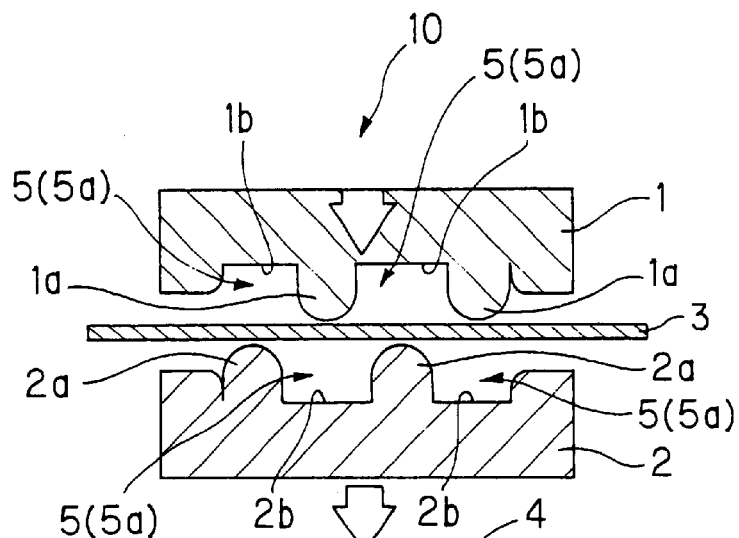
FIG.1(a)
FIG.1(b)
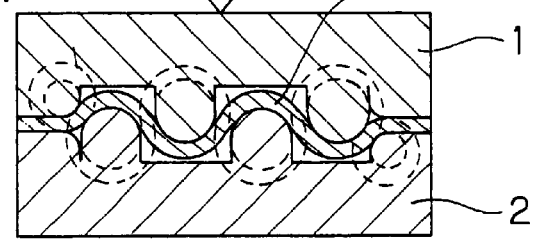
FIG.2(a)
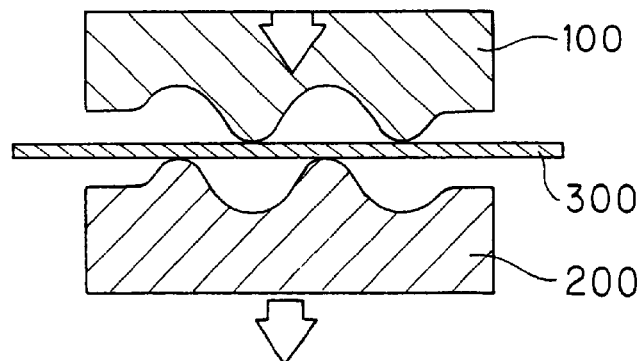
FIG.2(b)
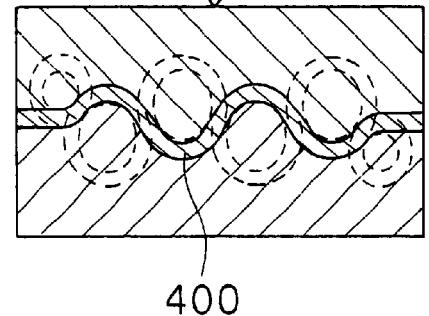

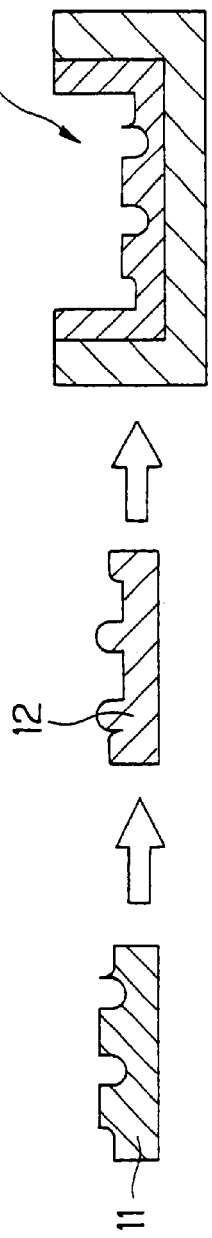
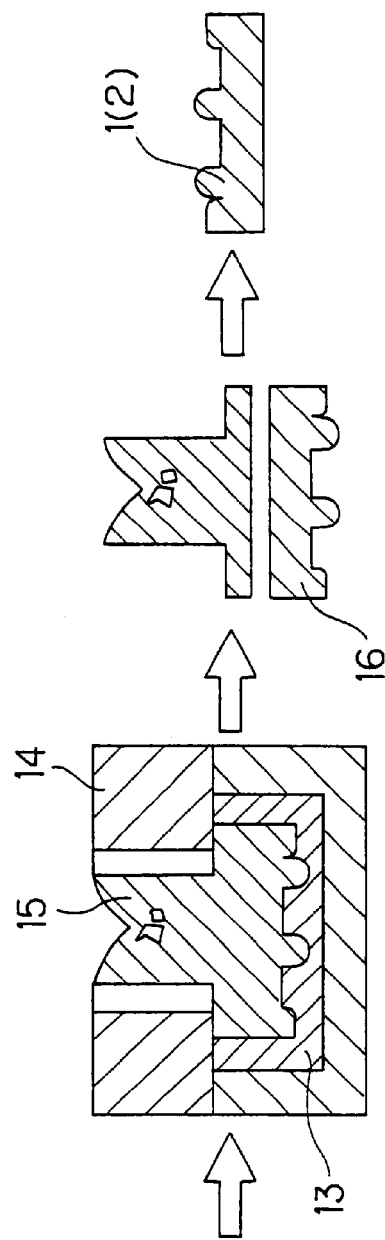

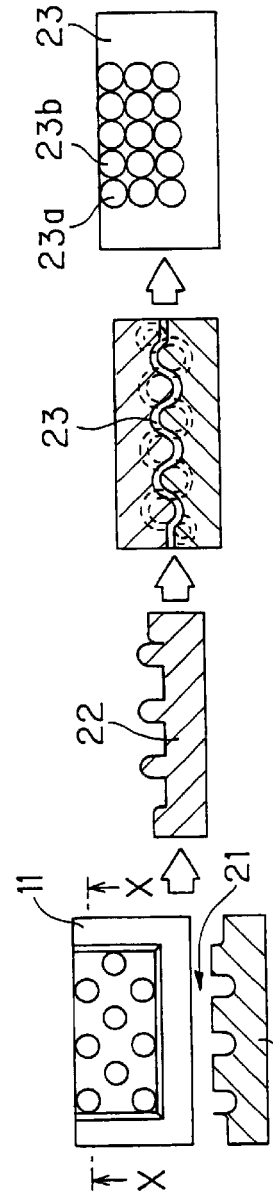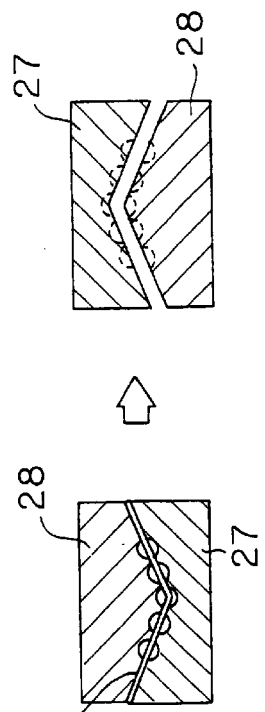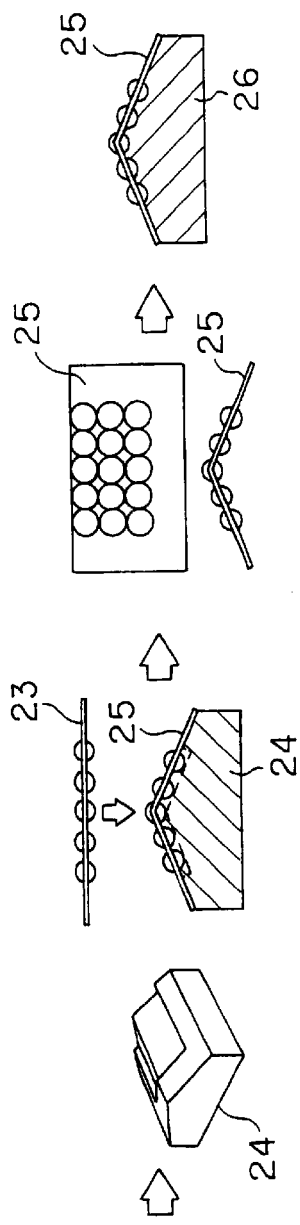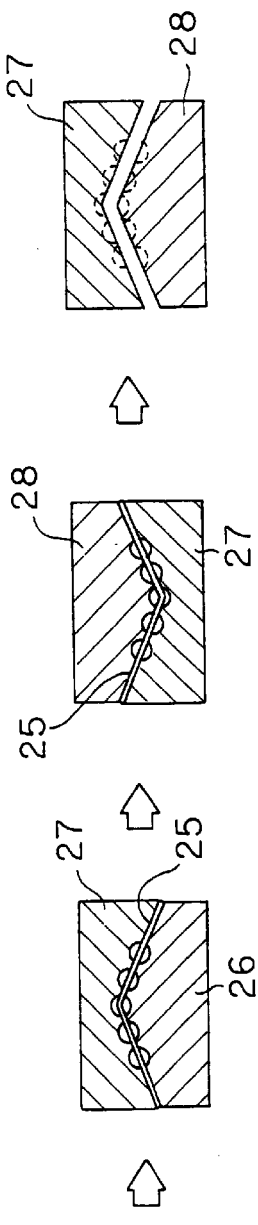

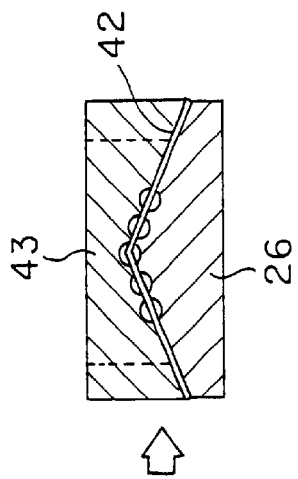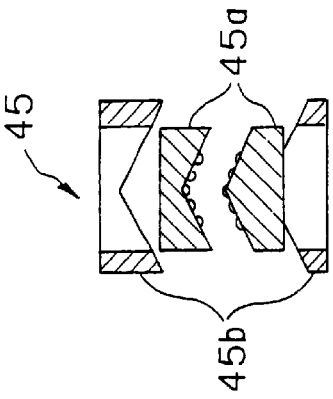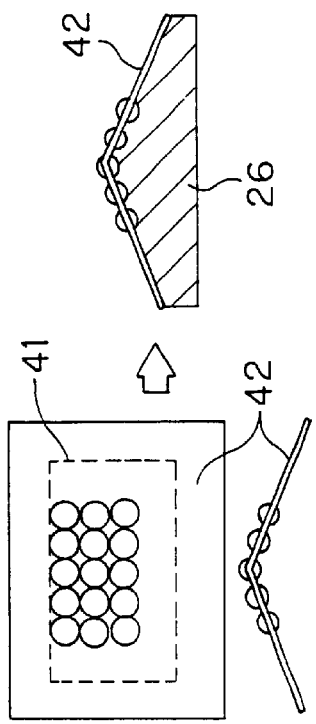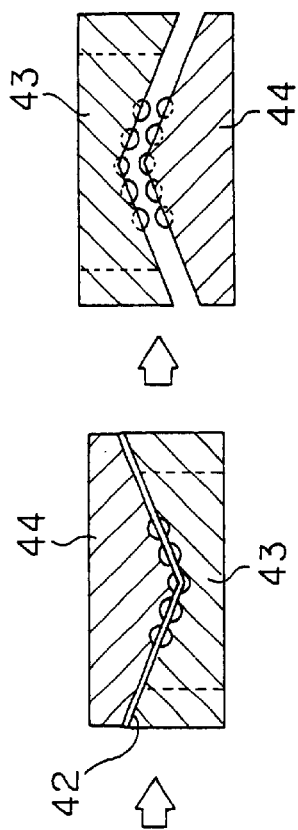
FIG.9(a) FIG.9(b) FIG.9(c) FIG.9(d) FIG.9(e) FIG.9(f)

SECTION TAKEN ALONG PLANE X

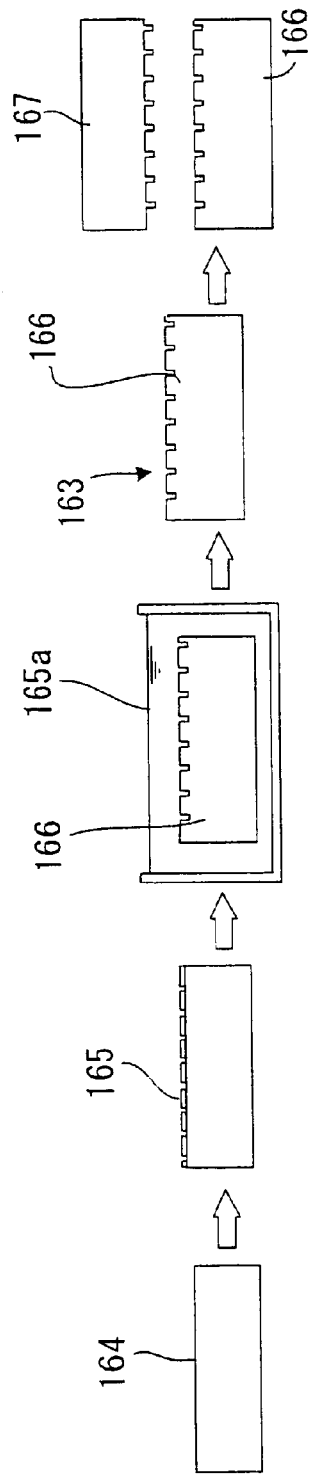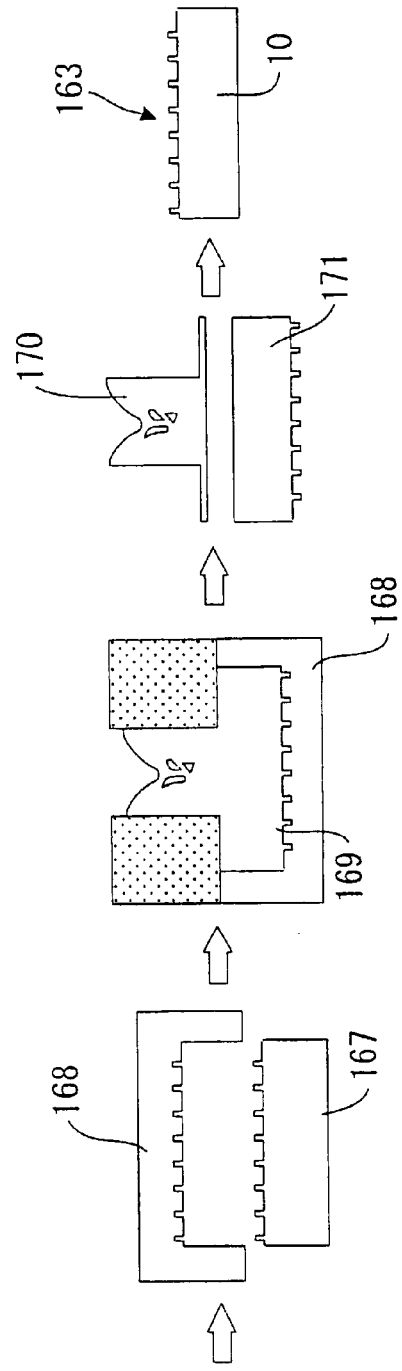

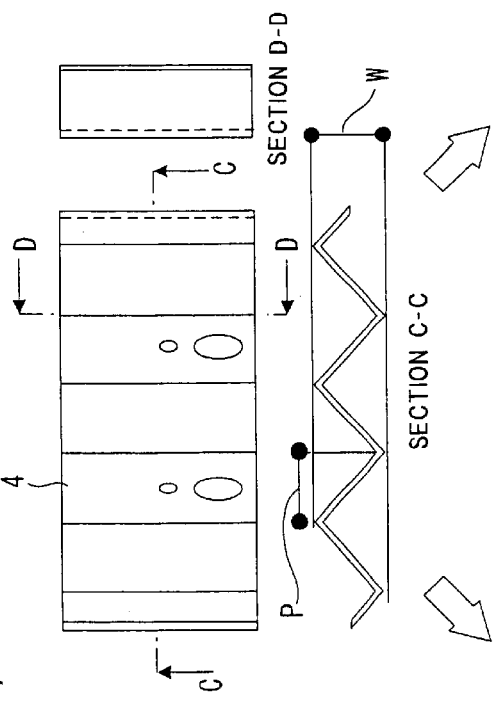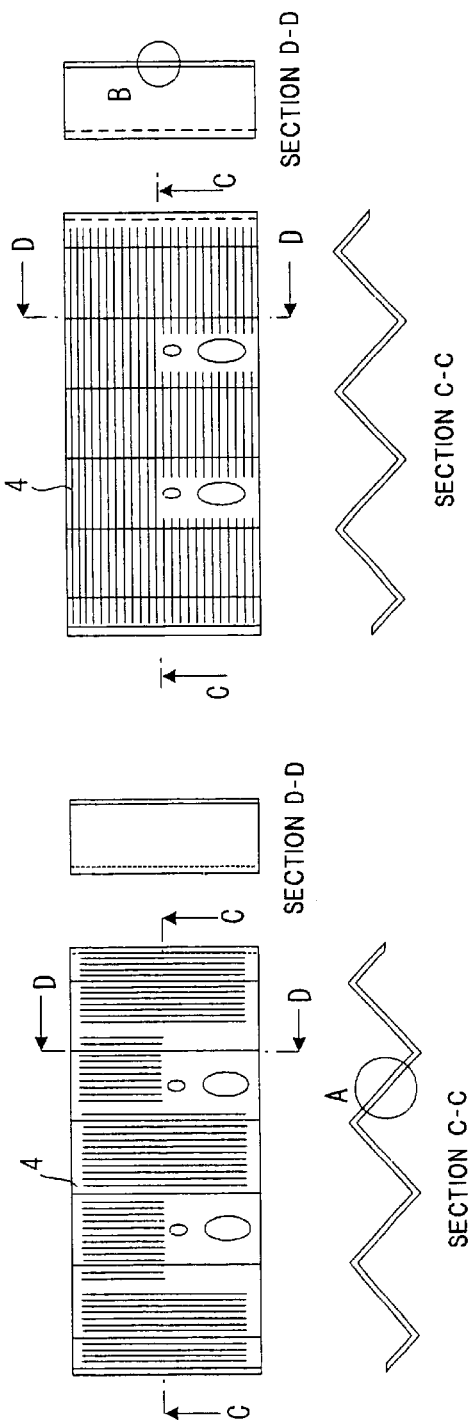
FIG.16(a)
FIG.16(b)
FIG.16(c)

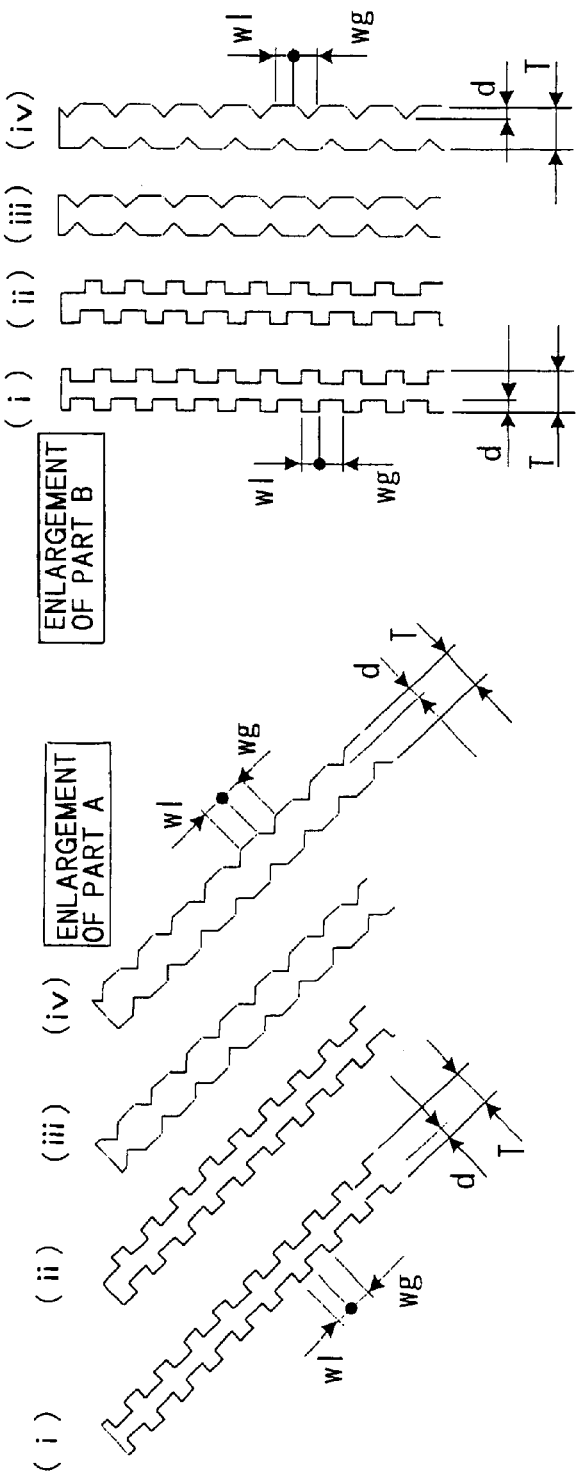

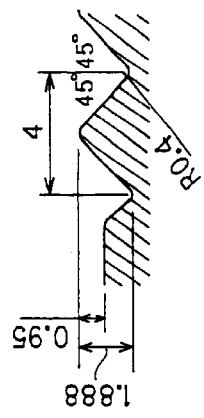
FIG.22(d) ENLARGEMENT OF PART A
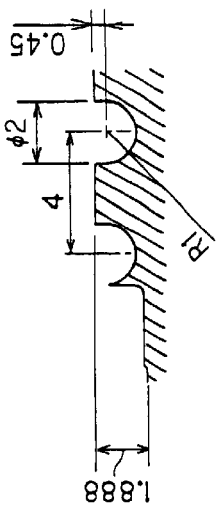
FIG.22(e) ENLARGEMENT OF PART B
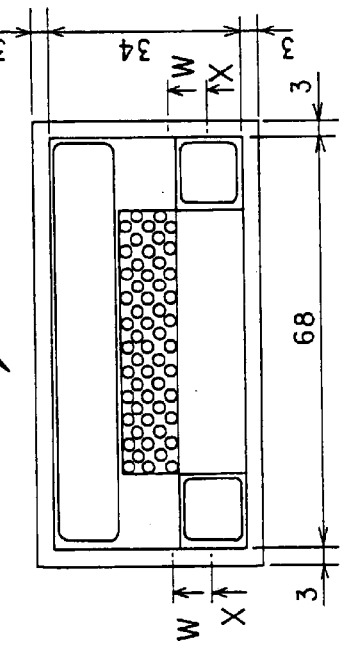
FIG.22(a)
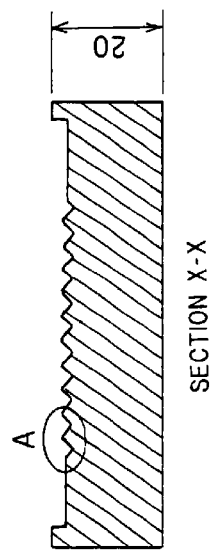
FIG.22(b) SECTION X-X
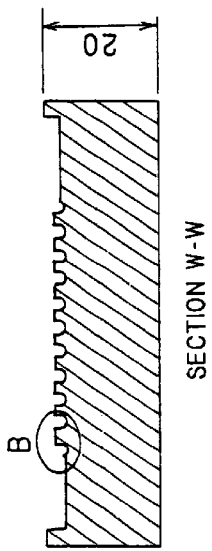
FIG.22(c) SECTION W-W

ENLARGEMENT OF PART A

SECTION U-U

FIG.26(a)
FIG.26(b)
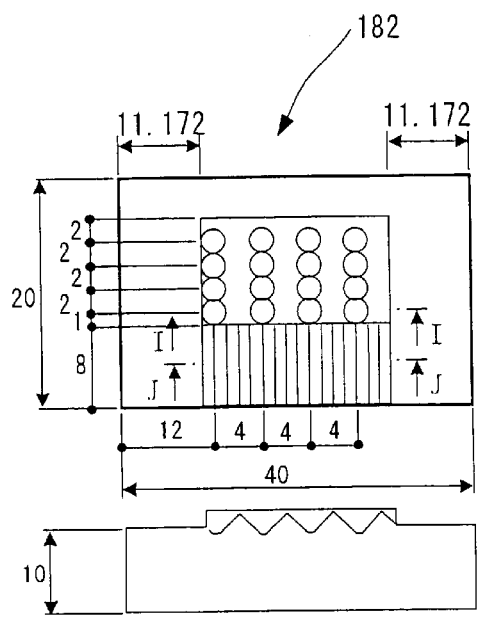
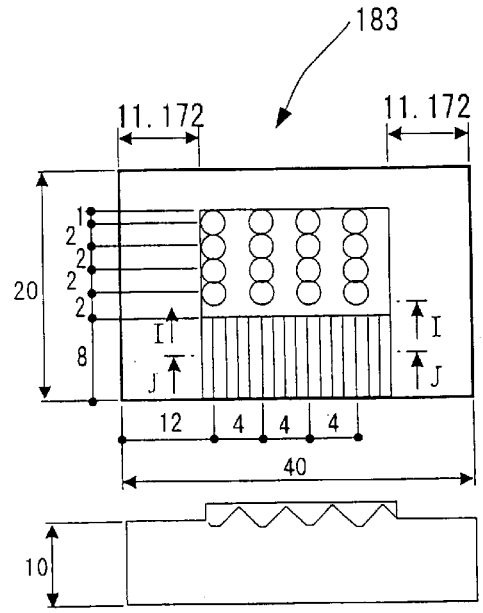
FIG.26(c) SECTION I-I
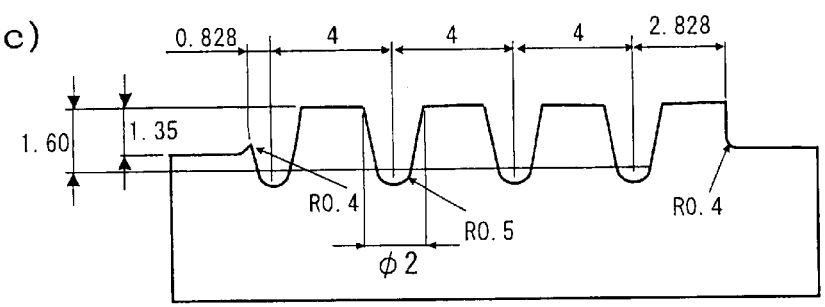
FIG.26(d) SECTION J-J
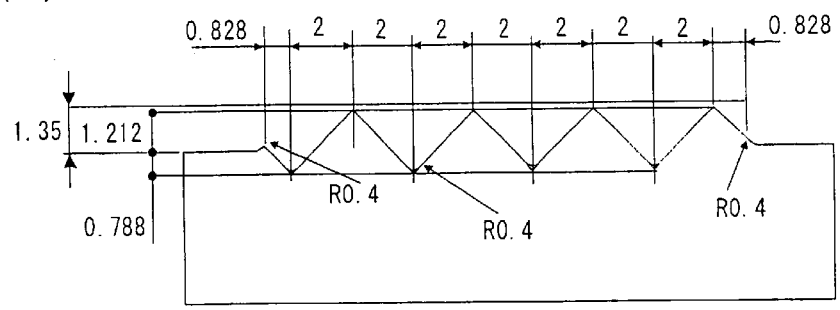

SECTION K-K

SECTION L-L

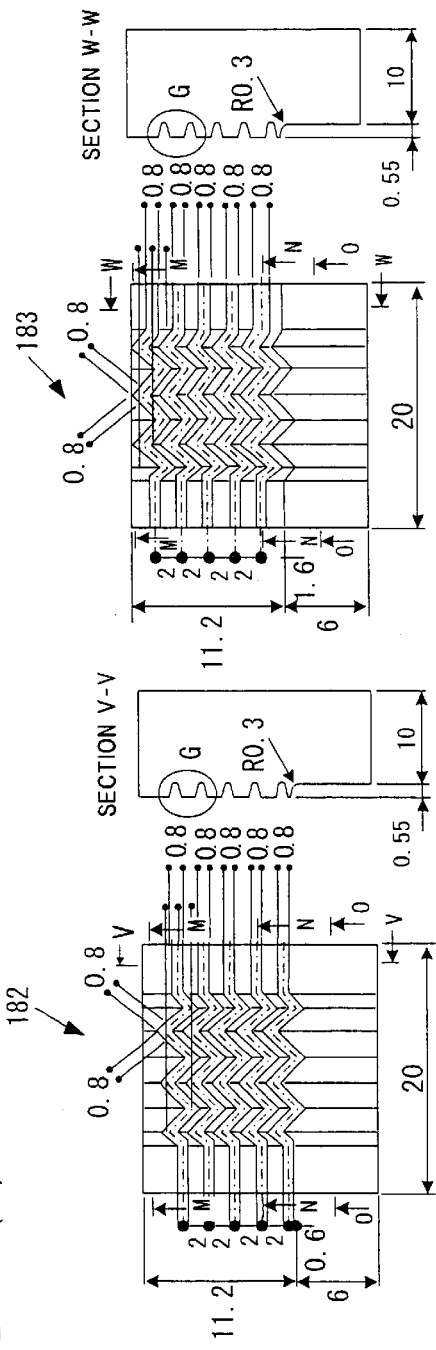
FIG.30(a)
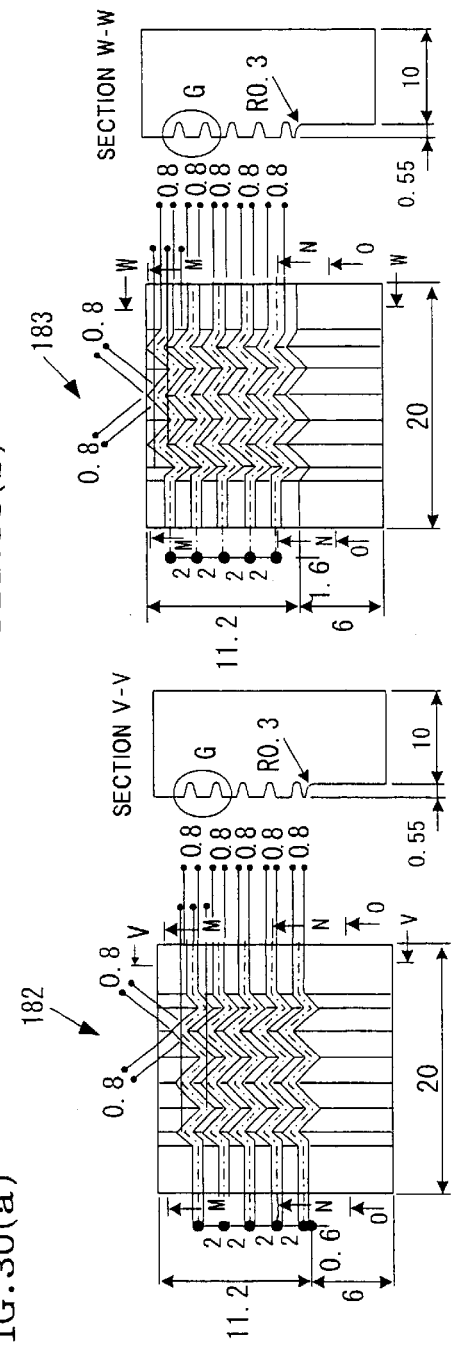
FIG.30(b)
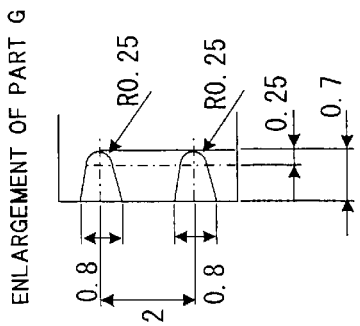
FIG.30(c)
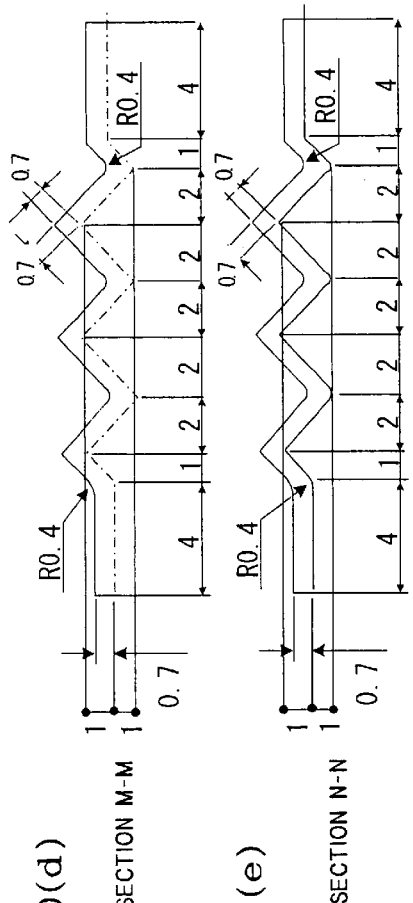
FIG.30(d)
FIG.30(e)
FIG.30(f)
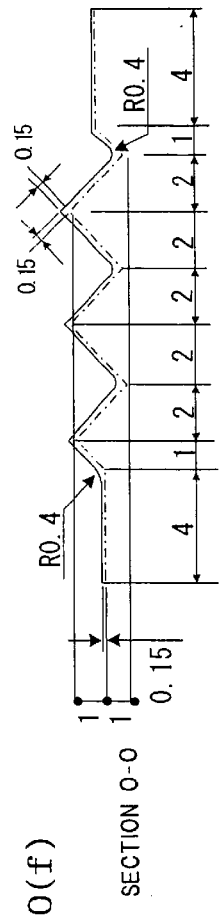

FIG.32(a)     FIG.32(b)
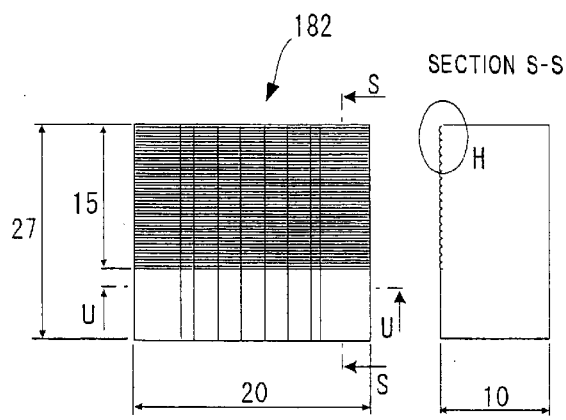 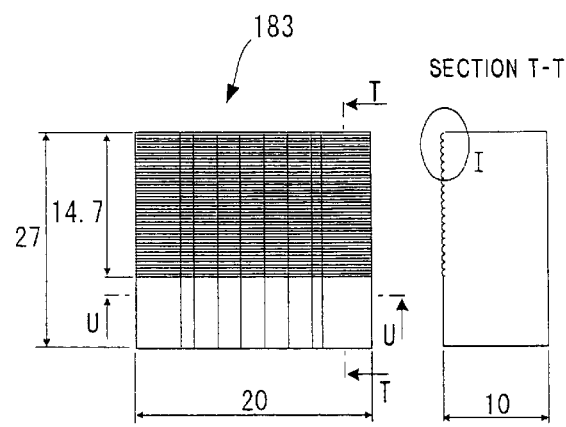
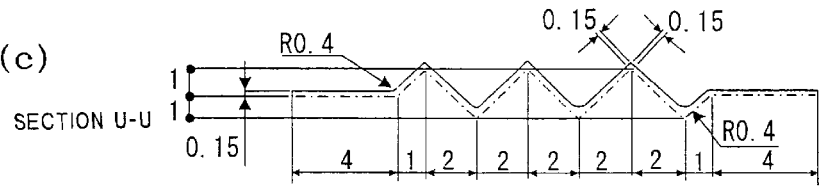
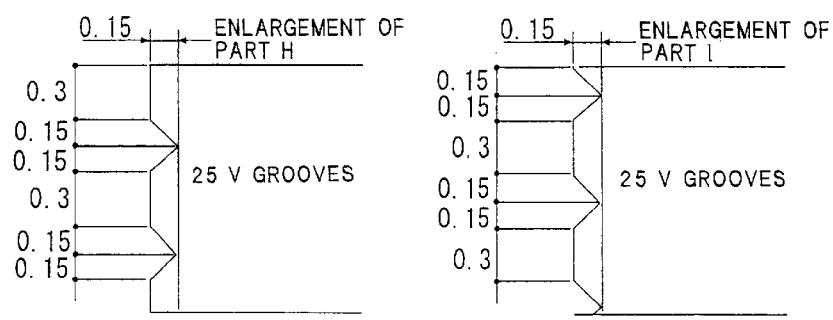
FIG. 32(d)     FIG. 32(e)

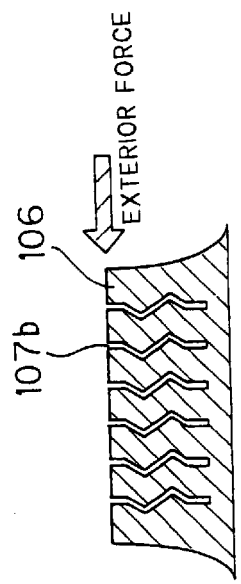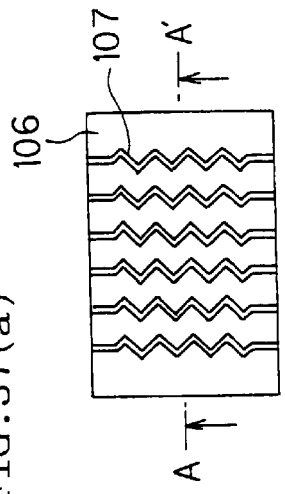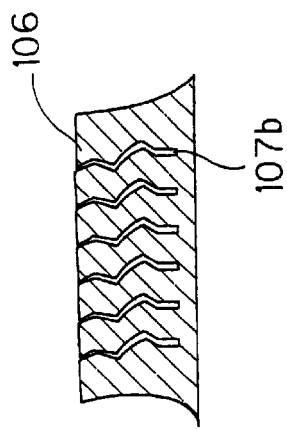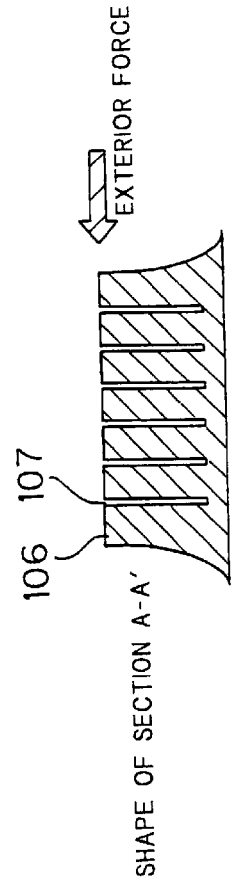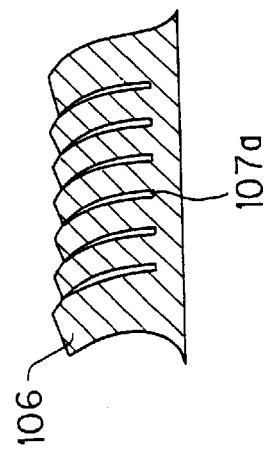

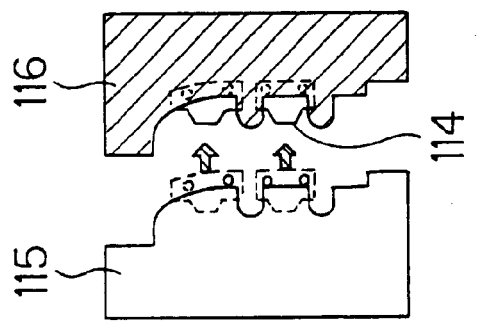
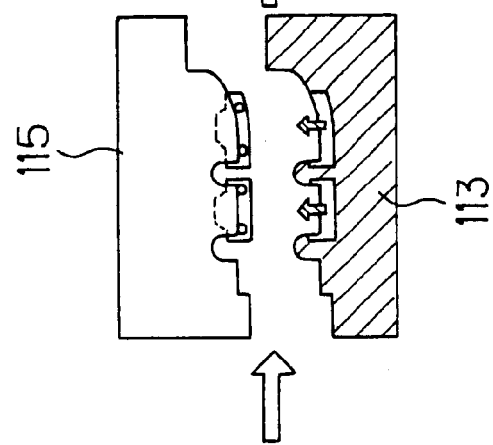
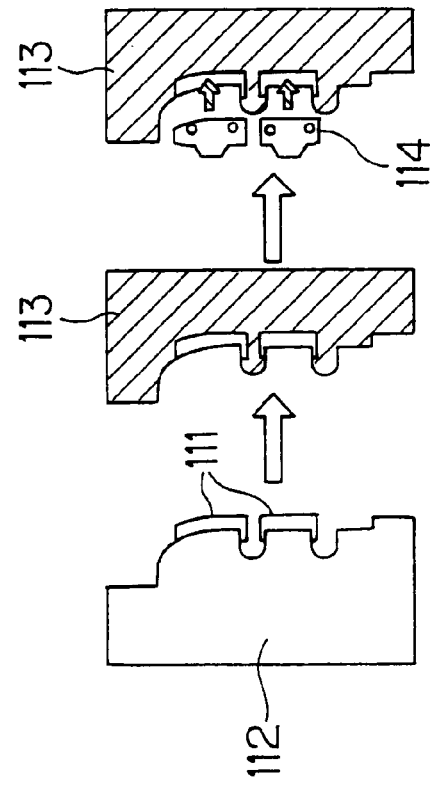
FIG.38(a) FIG.38(b) FIG.38(c) FIG.38(d) FIG.38(e)

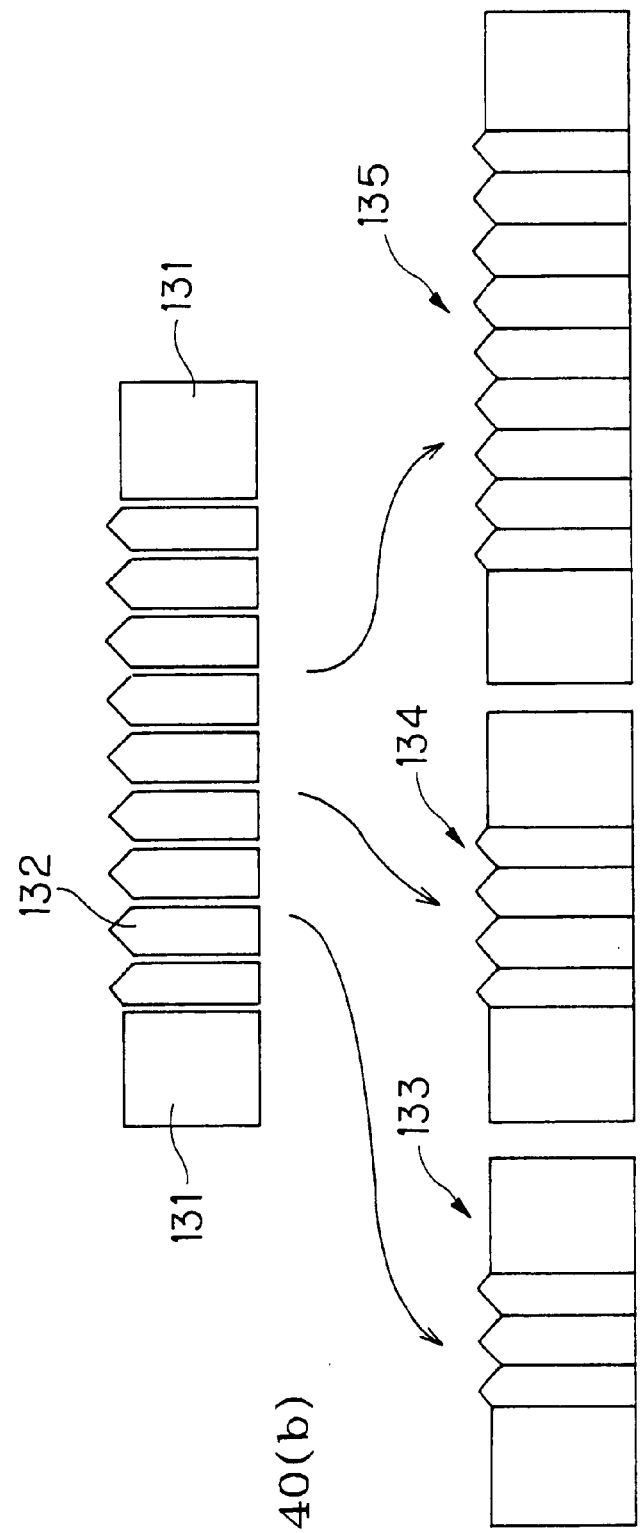

PRESS DIE FOR MOLDING SIPE BLADE AND METHOD OF MAKING THE PRESS DIE

BACKGROUND OF THE INVENTION

The present invention relates to a press die for molding a sipe blade and a method for making the press die. More particularly, it relates to a press die for molding a sipe blade which can efficiently mold a sipe blade having a complicated shape such as three-dimensional shape and having excellent mechanical strength characteristics and which can reduce production cost due to its simple structure, and a method for simply and efficiently making a press die for molding a sipe blade having a complicated shape such as a three-dimensional shape by a casting method.

Tire molds are difficult to make by machining methods because they have complicated designs with sharp dent-shaped corner portions or undercut shapes, and generally they are made by casting methods. Of these molds, many of them are made of aluminum alloys, cast irons or cast steels. This tendency is conspicuous, especially, when the design shapes of tires have many grooves of about 0.1–3.0 mm in width which are called "sipes" (specifically, studless tires, etc.) and these tire molds cannot be made by mechanical methods.

Here, the term "machining method" means forming methods other than those causing contraction in the molding, such as casting, and as examples thereof, mention may be made of various molding methods employed in conventional methods for making metal molds for molding two-dimensional shape sipe blades, such as wire electric discharge machining, NC machining which uses a ball end mill, and additionally, various methods which can directly mold the shape of metal molds, such as ultrasonic machining and electric discharge machining. Usually, wire electric discharge machining is employed because partial metal molds consisting of a pair of top and bottom molds can be obtained at a time. As for other molding methods, for example, partial metal molds consisting of a pair of top and bottom molds are obtained by making one of the molds and then making a reversal mold thereof.

As shown in FIG. 36, thick grooves 102 and 103 such as ribs and lugs are formed on a tire 101, but for special uses such as studless tires, sipes 104 which are thin grooves of about 0.1–3.0 mm in width are sometimes formed in addition to ribs and lugs to improve gripping force and drainage.

The sipes 104 are two-dimensional in shape, such as corrugated shape and zigzag shape at the ground contact face (profile face) for obtaining the effects of improving gripping force and drainage due to edge effects. Recently, for further improvement of tire performance, it is demanded that not only the profile face, but also the shape in the direction of diameter of tire have the similar two-dimensional shape (moreover, complicated curved faces such as a three-dimensional shape), namely, it is demanded to make the shape of sipes into three-dimensional shapes.

As shown in FIGS. 37(a)–37(e), since a three-dimensional shape sipe 107b can improve block stiffness of tire 106 as compared with the conventional two-dimensional shape sipe 107a, the tire 106 does not undergo buckling even at driving and braking and can be further improved in gripping force.

When the shape of a tire mold having the above sipes is made by casting out, the mold strength is sometimes insufficient, and in this case, especially, when a tire mold made of an aluminum alloy is used, there is generally employed a method of casting-in a sipe blade previously made of a material of high strength. In this case, since a tire mold having sipe is complicated in its design, a casting method is used instead of machining method.

As shown in FIGS. 38(a)–38(e), according to conventional methods for producing a tire, it is generally produced by a method which comprises disposing a sipe blade 111 (hereinafter sometimes referred to merely as "blade") at a pattern 112 for casting a tire mold(hereinafter sometimes referred to merely as "pattern") and then casting with a molten metal a blade 114 having finally a shape complementary to sipe 104 (see FIG. 36) to integrate with a metal mold 116 for molding a tire which is a reversal mold. In FIGS. 38, a rubber mold 113 and a gypsum mold 115 are used.

As shown in FIGS. 39(a) and 39(b), as a result of pursuing both the cost and the productivity, the sipe blade 111 which is used for conventional method for producing a tire has been mainly produced by a method which comprises press molding a thin plate material 121 which is punched or laser cut (wire electric discharging cutting) using a press die 10a made by wire electric discharge machining.

However, as shown in FIGS. 39(a) and 39(b), since the press die 10a is made by wire electric discharge machining, this method can be adapted to only the press die 10a having a two-dimensional shape formed by linearly moving a wire 117, and the resulting sipe blade ill is limited to one which has a two-dimensional shape (having a corrugated shape in the monoaxial direction). Thus, it is difficult to obtain a sipe blade which can remarkably improve the tire performance. The sipe blade 111 shown in FIG. 39 (c) consists of a cross vent hole 122, a locking hole 123, a sipe formed portion 124, and a portion 125 which is cast in the metal mold for molding.

As a method for making a sipe blade having a three-dimensional shape, a method is known which comprises subjecting a press die for molding to three-dimensional NC machining by a ball end mill, and press molding a thin raw material using the press die, but this method is high in cost and is not practical.

Furthermore, there is proposed a method of making a press die for molding by a casting method (JP-A-62001-25831). However, according to this method, preparation of shape data or setting of complicated shape is sometimes difficult, and, for example, it has been very difficult to optionally combine a plurality of molded shapes as one protrusion unit of protrusive mountain shape (protrusive mountain shape or protrusive dimple shape).

Moreover, in many cases, a sipe blade of three-dimensional shape is required to be a combination of a plurality of those having basic shapes in which the number of the molded protrusive mountains is changed in the range of about 1–20 protrusive mountains. Therefore, according to conventional methods, metal mold or casting pattern must be made one by one, and this is troublesome.

For solving these problems, it is known that as shown in FIGS. 40(a) and 40(b), many divided press dies 131, 132 in which a minimum number of molded protrusive mountain shapes are divided are previously made (FIG. 40(a)), and these are combined in a desired shape to make one press die (combined (fabricated) mold). However, there is a problem that such combined (fabricated) press dies 133, 134, 135 are not suitable for mass-production from the point of strength or from the practical point.

As shown in FIGS. 41(a) and 41(b), when it is necessary that the sipe blade 141 has a basic shape (primary shape)

consisting of protruded shapes (protrusive dimple) 144 and dented shapes (dented dimple) 145 (FIG. 41(*a*)), and additionally a molded shape (secondary shape) 143 which is larger than the basic shape in size is given to the whole sipe blade 141 (FIG. 41(*b*)), position of disposition of the primary shapes at the top and bottom molds of the divided press die must be changed, and it is very difficult to make a press die for molding with taking these points into consideration.

As shown in FIG. 42(*a*), there is a further problem that at the time of actual molding of sipe blades, in the case of the shape being more complicated, such as having the two-dimensional shape 153 and the three-dimensional shape 154, the drawn shape of the sipe blade after press molding has the curved shape 152, being different from the shape 151 assumed before press molding. Thus, it is difficult to put the peripheral shape in a given scope. This problem can be solved by trimming the peripheral shape of the sipe blade after press molding. However, it is more difficult to make a trimming die applicable to fine and complicated curved faces such as those of three-dimensional shapes than to make a press die. Thus, this method cannot be practically employed.

The curving phenomenon occurs for the following reasons. That is, when the total length shrinkage caused by molding is considered by minimum unit of molding, the reason is as follows.

As shown in FIG. 42(*b*), in the case of molding the material 155 of two-dimensional shape, the total length shrinkage 156 occurs uniformly in the whole area (strictly speaking, it appears that there is no change in extended length, and the length becomes shorter only in the chord length).

Further, as shown in FIG. 42(*c*), in the case of molding the material 157 of three-dimensional shape, the total length shrinkage 158 occurs non-uniformly. Therefore, the average total length shrinkage per one section becomes smaller than the case of two-dimensional molded shape which is the same in amplitude of molded protrusive shape (molded protrusive mountain or molded protrusive dimple). Therefore, when pitch and amplitude of the two-dimensional molded shape are set in correspondence to pitch and maximum amplitude of the three-dimensional molded shape such as protrusive dimple, the two-dimensional molded portion undergoes the greater total length shrinkage at the time of press molding to cause curved deformation as shown in FIG. 42(*a*).

The more complicated problem is that at the time of actual press molding, the phenomenon "squeezing" occurs due to the frictional resistance between the press die and the sipe blade material, resulting in total length elongation due to the reduction in thickness of the sipe blade.

Accordingly, there is the complexity of the problem in that even when the difference of the total length elongation can be analytically calculated from the molded shape, molding behavior corresponding thereto is not shown. In addition, there are all of the influences such as materials of sipe blades, materials of press die, surface state, lubrication condition, pressing conditions, and the like.

In order to solve these problems, there are proposed various methods for making sipe blades having a three-dimensional molded shape and methods for making press die thereof (e.g., JP-2000-280751 and JP-A-2001-91447). By employing these methods, the above problems can be solved and sipe blades of three-dimensional shape can be practically made, but as for the important three-dimensional shape per se of the sipe blades, those which satisfy all of remarkable improvement of tire performance, diminishment of generation of troubles in making tire molds and in maintenance thereof, and the like have not yet been proposed.

That is, the three-dimensional molded shape of the sipe blades used for conventional tire molds have the following problems.

As shown in FIG. 43(*a*) and FIG. 43(*b*), in the case of the sipe blade 111 of the three-dimensional molded shape as shown in "pneumatic tire" proposed in JP-A-2001-1722, the performance of the resulting tires have no problems, but as shown in FIG. 44(*a*) and FIG. 44(*b*), in the case of these sipe blades 111 being disposed in a tire mold 116 at a high density, when vent holes 161, etc. are to be opened in the mold per se from the side of curvature center of the mold, the sipe blade 111 which is disposed in the mold 116 and gives the corresponding sipe shape and a working tool interfere with each other (being obstructed by the dented and protruded shape of the sipe blade 111) to make it impossible to form the vent holes 161.

In the case of the shape of sipe blade disclosed in JP-A-20001-1722, it is difficult to draw the sipe blade out of the tire mold per se and re-plant it in repairing of the mold. In the technique of JP-A-2000-280751, the cast-in portion has no undercut shape, and thus the above trouble is overcome.

Similarly, as shown in FIG. 45, when "crank molded" shape in the "pneumatic tire" disclosed in JP-A-11-78432 is employed in three-dimensional molded shape, the troubles as mentioned above are apt to occur. In this case, the troubles caused by drawing and replanting of the sipe blade in repairing of mold do not occur.

Furthermore, as shown in FIG. 46, a great bending load sometimes acts on the tire mold, especially on the sipe blade at the time of molding of tire. In this case, whether the molded shape of the sipe blade can exhibit a great drag against the bending load or not affects the deformation and failure life of the sipe blade per se. This can be explained by a physical model corresponding to the bending of cantilever beam in material dynamics, and when the same material of sipe blade and plate thickness are used, the sipe blade having a molded shape which has a greater section modulus in respect to the axis of bending load can stand the greater bending load. Accordingly, by selecting a sectional shape greater in section modulus, a sipe blade stronger against the same bending moment can be obtained.

The section modulus here means a material dynamic parameter relating to the sectional shape of a beam as described, for example, in Seike Seiichiro's Kogaku Kiso, "Zairyo Rikigaku (materials dynamics)" published from Kyoritsu Shuppan Co.

As shown in FIG. 47(*a*) and FIG. 47(*b*), in the case of two sipe blades (planar sipe blade 111*a* and two-dimensional molded sipe blade 111*b*), both the sipe blades 111*a* and 111*b* produce a maximum bending stress at the section X against a bending load H. When they have the same thickness, the two-dimensional molded sipe blade 111*b* is greater in section modulus at the section X than the planar sipe blade 111*a*, and, hence, the two-dimensional molded sipe blade 111*b* is smaller in the maximum bending stress generated at the section X.

As shown in FIG. 48(*a*) and FIG. 48(*b*), in the case of a dimpled three-dimensional molded shape, the sectional shape becomes nearly planar at the portions ①and ②against the bending load, and these portions become smaller in section modulus than other portions. Therefore, when a bending load acts on the three-dimensional molded sipe blade 111c, troubles such as deformation and breakage are apt to occur at the portion ①on which a larger stress acts and thus there occurs a problem in strength.

As shown in FIG. 49(a) and FIG. 49(b), in the case of the three-dimensional sipe blade 111c disclosed in JP-A-2001-1722, the similar phenomenon also occurs, and section modulus of the portion shown by a one-point chain line becomes smallest and, as a result, deformation or breakage is apt to occur at this portion. This sipe blade 111c gives satisfactory performance of the resulting tire, but the strength characteristics as a tire mold is not sufficient.

SUMMARY OF THE INVENTION

The present invention has been made in view of the above problems. The object of the present invention is to provide a press die for molding a sipe blade by which a sipe blade having a complicated shape such as a three-dimensional shape and having excellent mechanical strength characteristics can be efficiently molded and which has a simple structure and can reduce the production cost, and a method for making simply and efficiently a press die for molding a sipe blade having a complicated shape such as three-dimensional shape by a casting method.

As a result of intensive research conducted by the inventors for attaining the above objects, it has been found that the above object can be attained by the following procedures. That is, basically, as a pattern used for the method for making a press die for molding a sipe blade utilizing a casting method, a metal mold having a shape which is reverse to the shape of the press die for molding sipe blade is made by machining or the like, and a portion of the press die for molding a sipe blade to which a load is applied by molding pressure in contact with a material for the sipe blade is allowed to have a shape (normal shape) corresponding to the desired shape of the sipe blade in order to impart the desired shape to the sipe blade, and, besides, a portion to which a load is not applied by the molding pressure without contacting with the material for the sipe blade is allowed to have a relief part which does not correspond to the desired shape of the sipe blade and dose not substantially contact with the sipe blade after molded. Thus, the present invention has been accomplished. That is, the following press die for molding a sipe blade and a method for making the mold are provided by the present invention.

According to a first aspect of the present invention, a press die for molding a sipe blade which comprises a pair of divided parts composing a press die between which a material of the sipe blade is interposed and pressed to mold a sipe blade having a desired shape, characterized in that a portion of each of the pair of the divided parts composing a press die to which a load is applied by a molding pressure in contact with the material for the sipe blade has a shape corresponding to the desired shape of the sipe blade in order to impart the desired shape to the sipe blade, and the portion to which a load is not applied by the molding pressure without contacting with the material for the sipe blade has a relief part which dose not substantially contact with the sipe blade after molded.

According to a second aspect of the present invention, a press die for molding a sipe blade according to the first aspect is provided, wherein the pair of the divided parts composing a press die are made using a machining method or a casting method.

According to a third aspect of the present invention, a press die for molding a sipe blade according to the first or second aspects is provided, wherein a first relief part which does not substantially contact with the sipe blade has a depth equal to or greater than the height of the opposing portions to which a load is applied by the molding pressure and comprises a groove having a bottom horizontal to the surface of the material of the sipe blade.

According to a fourth aspect of the present invention, a press die for molding a sipe blade according to any one of the first to third aspects is provided, wherein the pair of the divided parts composing a press die have three-dimensional dented and protruded shape corresponding to the shape of the sipe blade, the portion of the metal molds to which a load is applied by the molding pressure due to contact with the material of the sipe blade has a protruded shape, and the portion to which a load is not applied by the molding pressure without contacting with the material for the sipe blade has a dented shape.

According to a fifth aspect of the present invention, a press die for molding a sipe blade according to the fourth aspect is provided, wherein the shapes of the pair of the divided parts composing a press die are discontinuous with individually and independently maintaining the plurality of the three-dimensional shapes, and a second relief portion which does not substantially contact with the material for sipe blade is formed at the crossing part thereof.

According to a sixth aspect of the present invention, a press die for molding a sipe blade according to the fourth aspect is provided, wherein in correspondence to the shape of the sipe blade, the shapes of a pair of divided parts composing a press die are three-dimensional dented and protruded shapes having a primary molded shape and a secondary molded shape and have a plurality of protruded shape portions to which a load is applied by the molding pressure in contact with the material for sipe blade and are disposed so that a curved face formed by connecting the apexes of the protruded shape portions forms a primary molded shape.

According to a seventh aspect of the present invention, a method for making a press die for molding a sipe blade is provided, comprising a pair of divided parts composing a press die between which a material of the sipe blade is interposed and pressed to mold a sipe blade having a desired shape by forming a pattern having a shape reverse to the shape of the pair of the divided parts composing a press die and then forming from the pattern a casting having a shape reverse to that of the pattern, characterized in that a plurality of patterns having a shape reverse to the shape of the pair of the divided parts composing a press die are formed so that the pair of the metal molds have such shape that the portion to which a load is applied by molding pressure in contact with the material for the sipe blade has a shape corresponding to the desired shape of the sipe blade and the portion to which a load is not applied by molding pressure without contacting with the material for the sipe blade is provided with a first relief part which does not correspond to the desired shape of the sipe blade and does not substantially contact with the sipe blade after molded, and then a casting having a shape reverse to the pattern is formed.

According to an eight aspect of the present invention, a method for making a press die for molding a sipe blade according to the seventh aspect is provided, wherein a plurality of the patterns having a shape reverse to the shape of the pair of the divided parts composing a press die are formed by a machining method and then the castings having the shape reverse to the patterns are formed by a casting method.

According to a ninth aspect of the present invention, a method for making a press die for molding a sipe blade according to the seventh or eighth aspects is provided, wherein the first relief part which does not substantially contact with the sipe blade comprises a groove having a depth equal to or greater than the height of the protruded shape of the opposing divided parts composing a press die and, besides, having a bottom horizontal to the surface of the material for the sipe blade.

According to a tenth aspect of the present invention, a method for making a press die for molding a sipe blade according to any of the seventh to ninth aspects is provided, wherein the shape of the portions to which a load is applied by the molding pressure in contact with the material for the sipe blade is allowed to have a protruded shape and the shape of the portions to which a load is not applied by the molding pressure without contacting with the material for the sipe blade is allowed to have dented shape so as to give a three-dimensional dented and protruded shape to a pair of divided parts composing a press die in correspondence to the shape of the sipe blade.

According to an eleventh aspect of the present invention, a method for making a press die for molding a sipe blade according to the tenth aspect is provided, wherein a plurality of protruded portions to which a load is applied by the molding pressure in contact with the material for the sipe blade are formed and simultaneously apexes of the protruded portions are disposed so that a curved face formed by connecting the apexes forms the primary molded shape so as to give a three-dimensional dented and protruded shape to the pair of divided parts composing a press die in correspondence to the shape of the sipe blade.

According to a twelfth aspect of the present invention, a method for making a press die for molding a sipe blade according to any of the seventh to eleventh aspects is provided, wherein a plurality of pattern parts divided into basic shapes commonly included in the plurality of the shapes of the sipe blade are previously prepared and these pattern parts are optionally combined to construct the pattern so that sipe blades having a plurality of shapes can be optionally provided.

According to a thirteenth aspect of the present invention, a method for making a press die for molding a sipe blade according to any one of the seventh to eleventh aspects is provided, wherein the pattern is formed so that the shapes of a pair of divided parts composing a press die are discontinuous with individually and independently maintaining a plurality of the shapes, and a second relief part which does not substantially contact with the material for sipe blade is formed at the crossing part.

According to a fourteenth aspect of the present invention, a method for making a press die for molding a sipe blade according to any one of the seventh to thirteenth aspects is provided, wherein a first reversal mold having a first shape reverse to the shape of the pattern or combination thereof (reversal mold, etc.) is formed, a first sipe blade replica comprising a material easy in molding, such as sheet wax, is molded using the resulting reversal mold using the resulting reversal mold, a second shape is imparted to this first sipe blade replica using a given molding mold to mold a second sipe blade replica having both the first shape and the second shape, a pair of second reversal molds having a shape reverse to the shape of the second sipe blade replica is formed using the second sipe blade replica, and a casting having both the first shape and the second shape is formed from the second reversal mold using a casting method.

According to a fifteenth aspect of the present invention, a method for making a press die for molding a sipe blade having less protruded shapes than the dented shapes of the pattern and/or the second reversal mold obtained in the intermediate stage in the method according to any one of the seventh to fourteenth aspects using the pattern or the second reversal mold obtained in the intermediate stage in the method according to any one of the seventh to fourteenth aspects, or combination thereof (pattern, etc.) is provided, characterized in that the dented shape portion of the pattern and/or the second reversal mold is filled with a filler so that the surface of the dented shape portion is in one plane, thereby forming a new pattern, and a casting having a shape reverse to the shape of this new pattern is formed from the new pattern by a casting method.

According to a sixteenth aspect of the present invention, a method for making a metal mold for trimming a sipe blade (trimming die) having a given shape from a sipe blade rough mold which is larger in size than the sipe blade and formed by molding a material for the sipe blade is provided, characterized in that a third sipe blade replica larger than the sipe blade and comprising a material easy in molding such as sheet wax is molded from the pattern, the first reversal mold having the shape reverse to the shape of the new pattern or the mold for the secondary molded shape formed in the intermediate stage of the method according to any one of the seventh to fifteenth aspects, or combination thereof (reversal mold, etc.), a pair of third reversal molds are made using the third sipe blade replica, and a trimming die is formed using the third reversal mold by a casting method.

According to a seventeenth aspect of the present invention, a method for making a press die for molding a sipe blade is provided, comprising a pair of divided parts composing a press die between which a material of the sipe blade is interposed and pressed to mold a sipe blade having a desired shape by forming a pattern having a shape reverse to the shape of the pair of the divided parts composing a press die and then forming a casting having a shape reverse to the shape of the pattern, characterized in that the portion of the pattern corresponding to the dented and protruded shape in the secondary molded shape of the pair of the divided parts composing a press die is formed by using a cutter mark in a chemical molding method, a physical corrosion method or a machining method so that the pair of the metal molds have a three-dimensional dented and protruded shape having a primary molded shape and a secondary molded shape provided with a dented and protruded shape.

According to an eighteenth aspect of the present invention, a method for making a press die for molding a sipe blade according to the seventeenth aspect is provided, wherein a chemical etching method is employed as the chemical molding method.

According to a nineteenth aspect of the present invention, a method for making a press die for molding a sipe blade is provided comprising a pair of divided parts composing a press die between which a material of the sipe blade is interposed and pressed to mold a sipe blade having a desired shape by forming a pattern having a shape reverse to the shape of the pair of the divided parts composing a press die and then forming a casting having a shape reverse to the shape of the pattern, characterized in that the portion of the pattern corresponding to the dented and protruded shape in the secondary molded shape of the pair of the divided parts composing a press die is formed by using a porous material as a material of the pattern so that the pair of the metal molds have a three-dimensional dented and protruded shape having a primary molded shape and a secondary molded shape provided with a dented and protruded shape.

According to a twentieth aspect of the present invention, a sipe blade for a tire mold is provided, which is molded using a press die for molding a sipe blade according to any one of the first to sixth aspects.

According to a twenty-first aspect of the present invention, a sipe blade for a tire mold is provided, which is molded using a press die for molding a sipe blade made by a method for making a press die for molding a sipe blade according to any one of the seventh to fifteenth and seventeenth to nineteenth aspects.

According to a twenty-second aspect of the present invention, a sipe blade for a tire mold according to the twentieth or twenty-first aspects is provided, which has a ½ pitch of 1–5 mm and an amplitude of 1–5 mm of the primary molded shape and a ½ pitch of 0.05–2.5 mm and an amplitude of 0.05–2.5 mm of the secondary molded shape.

According to a twenty-third aspect of the present invention, a tire mold formed by using the sipe blade for a tire mold is provided according to any one of the twentieth to twenty-second aspects.

BRIEF DESCRIPTION OF THE DRAWINGS

FIG. 1(a) and FIG. 1(b) are schematic sectional views showing one embodiment of the press die for molding a sipe blade of the present invention.

FIG. 2(a) and FIG. 2(b) are schematic sectional views showing one embodiment of conventional press die for molding a sipe blade.

FIG. 5(a), FIG. 5(b), FIG. 5(c), FIG. 5(d), FIG. 5(e) and FIG. 5(f) are schematic sectional views which show one embodiment of a method for making a press die for molding a sipe blade of the present invention.

FIG. 7(a), FIG. 7(b), FIG. 7(c), FIG. 7(d), FIG. 7(e), FIG. 7(f), FIG. 7(g), FIG. 7(h), FIG. 7(i) and FIG. 7(j) are schematic oblique sectional views which show another embodiment of a method for making a press die for molding a sipe blade of the present invention where a metal mold having both the primary molded shape and the secondary molded shape is molded.

FIG. 9(a), FIG. 9(b), FIG. 9(c), FIG. 9(d), FIG. 9(e), and FIG. 9(f) are schematic sectional views which show one embodiment of a method for making a trimming die for trimming a sipe blade of the present invention.

FIG. 11(a), FIG. 11(b), FIG. 11(c), FIG. 11(d), FIG. 11(e), FIG. 11(f), FIG. 11(g), FIG. 11(h), and FIG. 11(i) are schematic sectional views which show the order of steps of the method explained referring to FIG. 10(a) and FIG. 10(b) where a chemical molding method (chemical etching method) is used.

FIG. 14(c) is one which is easy in avoiding interference of working tool used in working.

FIG. 16(a), FIG. 16(b), and FIG. 16(c) are explanatory and sectional views which schematically show Specific Example 2 of the sipe blade for a tire mold of the present invention.

FIG. 17(a) and FIG. 17(b) are enlarged views which show the sectional shape of parts of the sipe blade shown in FIGS. 16(b)–16(c), where FIG. 17(a) shows part A of FIG. 16(b), and FIG. 17(b) shows part B of FIG. 16(c).

FIG. 22(a), FIG. 22(b), FIG. 22(c), FIG. 22(d), and FIG. 22(e) are explanatory and sectional views which schematically show the shape of the pattern in one example of the method for making press die for molding the sipe blade of the present invention; wherein FIG. 22(b) shows a sectional view of the shape shown in FIG. 22(a) by Line X—X, FIG. 22(c) shows a sectional view of the shape shown in FIG. 22(a) by Line W—W, FIG. 22(d) shows an enlarged sectional view of the portion A in FIG. 22(b), and FIG. 22(e) shows an enlarged sectional view of the portion B in FIG. 22(c).

FIG. 23(a), FIG. 23(b) and FIG. 23(c) are explanatory and sectional views which schematically show the shape of the pattern in another example of the method for making press die for molding the sipe blade of the present invention; wherein FIG. 23(b) shows a sectional view of the shape shown in FIG. 23(a), and FIG. 23(c) shows an enlarged sectional view of the portion A in FIG.(b).

FIG. 26(a), FIG. 26(b), FIG. 26(c) and FIG. 26(d) are explanatory and sectional views which schematically show shapes of a pattern for top mold and a pattern for bottom mold in another example of the method for making press die for molding the sipe blade of the present invention.

FIG. 30(a), FIG. 30(b), FIG. 30(c), FIG. 30(d), FIG. 30(e) and FIG. 30(f) are explanatory and sectional views which schematically show shapes of a pattern for top mold and a pattern for bottom mold according to another example of the method for making press die for molding the sipe blade of the present invention.

FIG. 32(a), FIG. 32(b), FIG. 32(c), FIG. 32(d) and FIG. 32(e) are explanatory and sectional views which schematically show shapes of a pattern for top mold and a pattern for bottom mold in another example of the method for making press die for molding the sipe blade of the present invention.

FIG. 37(a), FIG. 37(b), FIG. 37(c), FIG. 37(d) and FIG. 37(e) are explanatory and sectional views which schematically show that difference is caused in block stiffness depending on the difference in shapes of sipes disposed at a tire and a grip power can be improved when the shape is a three-dimensional shape.

FIG. 38(a), FIG. 38(b), FIG. 38(c), FIG. 38(d) and FIG. 38(e) are sectional views which schematically show one example of the conventional methods for making a tire stepwise.

FIG. 40(a) and FIG. 40(b) are explanatory views which show one example of conventional method for making a press die for molding a sipe blade which uses as one metal mold by combining divided metal molds in a necessary form (combined (fabricated) mold).

Figure 3A:
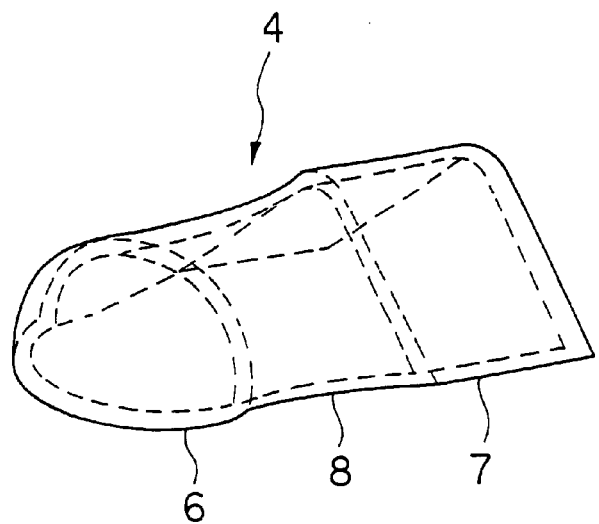
FIG. 3(a), FIG. 3(b) and FIG. 3(c) are schematic oblique views showing another embodiment of the press die for molding a sipe blade of the present invention where shapes of the metal mold does not faithfully correspond to a plurality of different three-dimensional shapes of the sipe blade, but the shapes are discontinuous with individually and independently maintaining a plurality of three-dimensional shapes, and, besides, a second relief portion is formed.

The following reference numerals and symbols in the drawings represent the following components:

1: one of the pair of partial molds (top mold);
1a: the portion to which a load is applied by molding pressure;
1b: the portion to which no load is applied by molding pressure;
2: one of the pair of partial molds (bottom mold);
2a: the portion to which a load is applied by molding pressure;
2b: the portion to which no load is applied by molding pressure;
3: material for the sipe blade;
4: sipe blade;
4a: conventional sipe blade;
5: first relief part;
5a: groove;
6: a portion having a different three-dimensional shape;
7: a portion having a different three-dimensional shape;
8: crossing part;
9: second relief part;
10: press die for molding a sipe blade;
10a: conventional press die for molding a sipe blade;
11: pattern;
12: rubber mold;
13: casting mold;
14: top mold;
15: molten metal;
16: casting (metal mold);
21: first shape;
22: first reversal mold;
23: first sipe blade replica;
23a: protruded shape;
23b: dented shape;
24: molding mold for a secondary molded shape;
25: second sipe blade replica;
26: backing material;
27: rubber mold for a top mold;
28: rubber mold for a bottom mold;
31: pattern, etc.;
32: dented shape;
33: filler;
34: new pattern;
41: shape to be trimmed;
42: third sipe blade replica;
43: third reversal mold;
44: third reversal mold;
45: metal mold for trimming (trimming die);
45a: inner mold;
45b: outer mold;
51: pattern;
61: pattern;
62: First replica;
63: second replica;
64: bending mold for a secondary molded shape (second shape);
71: inner mold;
72: outer mold;
73: trimming die (top mold);
74: trimming die (bottom mold);
101: tire;
102: thick groove such as rib;
103: thick groove such as lug;
104: sipe;
106: tire;
107: sipe;
107a: conventional two-dimensional shape sipe;
107b: three-dimensional shape sipe;
111: sipe blade;
111a: plane sipe blade;
11b: two-dimensional molded sipe blade;
111c: three-dimensional molded sipe blade;
112: pattern for casting for molding a tire;
113: rubber mold;
114: blade for a tire mold;
115: gypsum casting;
116: tire mold;
116a: tire mold (top and bottom integral mold);
117: wire;
121: thin plate material;
122: cross vent hole;
123: locking hole;
124: sipe forming part;
125: cast in part;
131: divided press die;
132: divided press die;
133: combined (fabricated) press die;
134: combined (fabricated) press die;
135: combined (fabricated) press die;
141: sipe blade;
142: basic shape (primary shape);
143: larger molded shape (secondary shape);
144: protruded shape (protruded dimple);
145: dented shape (dented dimple);
151: originally supposed trimmed shape;
152: sipe blade of curved shape;
153: two-dimensional shape;
154: three-dimensional shape;
155: material of trimmed shape of two-dimensional shape sipe blade;
156: total shrinkage in length;
157: material of trimmed shape of three-dimensional shape sipe blade;
158: total shrinkage in length;
159: crank molded shape;
160: molded tire;
161: vent hole;
162: protruded shape portion;
163: dented and protruded shape;
164: (basic) pattern;
165: mask;
165a: etching solution;
166: pattern with dented and protruded shape;

167: rubber mold;
168: casting mold;
169: casting;
170: hot top;
171: product part;
172: material of pattern;
173: cutter mark;
174: worked pattern;
175: rubber mold;
176: porous pattern;
180: projection corresponding to a rib;
181: projection corresponding to a lug;
182: pattern for a top mold;
183: pattern for a bottom mold;
184: pattern for changing the plate thickness;
185: top mold protrusion;
186: bottom mold protrusion;
100, 200: conventional pair of partial metal molds;
300: material for a sipe blade;
400: sipe blade;
A–F: pattern parts;
G: direction of removal of metal mold; and
H: bending load.

DETAILED DESCRIPTION OF THE INVENTION

As shown in FIGS. 1(a)–1(b), a press die 10 for molding a sipe blade of the present invention is composed of a pair of divided parts 1, 2 composing a press die 10, and a material 3 for the sipe blade is interposed and pressed between the pair of the divided parts 1, 2 to mold a sipe blade 4 having a desired shape. The press die 10 is characterized in that portions 1a and 2a, to which a load is applied by molding pressure in contact with the material 3 to impart the desired shape to the sipe blade 4, have shapes corresponding to the desired shape of the sipe blade 4. Portions 1b and 2b, to which a load is not applied, are provided with relief parts 5 (in FIGS. 1(a)–1(b), and these relief parts have shapes (i.e., grooves mentioned hereinafter) which do not correspond to the desired shape of the sipe blade 4 and which do not substantially contact the sipe blade.

Here, "do not substantially contact" means that the relief parts do not function to give the desired shape to the sipe blade.

Furthermore, it is preferred for the reduction of the production cost that the pair of the divided parts 1, 2 composing a press die 10 are made using a machining method and a casting method. A sintering method may be employed in place of the casting method.

As the materials for the sipe blade 3, suitable examples are thin plates comprising high-strength materials, such as metals having mechanical strength and durability capable of withstanding multiple tire moldings, for example, SUS420J2, SUS631, etc. The thickness is usually about 0.1–2.0 mm, though it depends on the width of the sipe. The shape is not particularly limited, and sipe blades of nearly rectangular shape are generally used, and the demand for sipe blades having complicated shapes such as three-dimensional dented and protruded shapes is enhanced.

In this way, sipe blades having complicated shapes such as three-dimensional shapes can be efficiently molded, and it becomes possible to reduce the production cost of the mold per se with a simple structure.

According to the conventional methods, when a sipe blade 400 having a three-dimensionally dented and protruded shape, for example, as shown in FIGS. 2(a)–2(b), is to be made, both the shapes of a pair of the divided parts composing a press die 100 and 200 between which a material 300 for sipe blade is interposed must correspond to the three-dimensional dented and protruded shape of the sipe blade 400. Directly making the metal mold having such a shape by a machining method requires many steps for both the preparation of data for the shape and for machining time, and therefore the above method has hardly been employed. Thus, sipe blades having three-dimensional dented and protruded shapes have hardly been employed.

As shown in FIGS. 1(a)–1(b), it is preferred that in the press die 10 for molding a sipe blade according to the present invention, each of the first relief parts 5, which do not substantially contact the sipe blade 4, have a depth that is equal to or greater than the height of the opposing portion (e.g., 1a, 2a, etc.) which undergoes a load by molding pressure, and further, comprises a groove 5a having a bottom surface that is horizontal to the surface of the material 3 for the sipe blade.

Furthermore, FIGS. 1(a)–1(b) show the case where in correspondence to the shape of the sipe blade 4, a pair of the divided parts composing a press die 1 and 2 have a three-dimensional dented and protruded shape. The portions 1a and 2a to which a load is applied by the molding pressure in contact with the material 3 have protruded shapes, and the portions 5 to which a load is not applied by the molding pressure have dented shapes. When a complicated shape such as three-dimensional dented and protruded shape is required as above, the press die for molding the sipe blade of the present invention can effectively exhibit the functions.

Figure 3B:
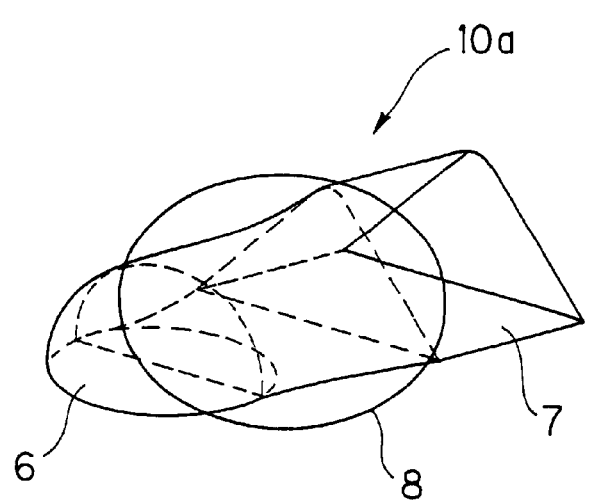

As shown in FIG. 3(a), the final sipe blade 4 has a plurality of different three-dimensional shapes 6 and 7 in such a state that the different shapes are continuously integrated at the crossing part 8. The conventional press die 10a for molding the sipe blade has a shape faithfully corresponding to the shape of the sipe blade 4 and has the different three-dimensional shapes 6 and 7 in such a state as the crossing part 8 is continuously integrated as shown in FIG. 3(b), but it is very difficult to make the mold 10(a) having such a complicated shape.

Figure 3C:
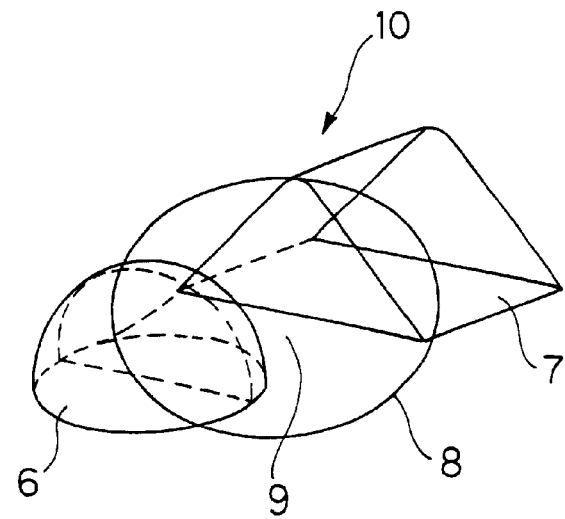

For solving the above problem, as shown in FIG. 3(c), in the press die 10 of the present invention, the shapes of the pair of the divided parts composing a press die do not necessarily correspond faithfully to the plurality of different three-dimensional shapes of the sipe blade 4 which are continuously integrated at a crossing part. That is, the shapes of the pair of the divided parts 1, 2 composing a press die 10 may be discontinuous at the crossing part 8 with individually and independently maintaining the plurality of the three-dimensional shapes 6 and 7, and a second relief portion 9 which does not substantially contact the material for the sipe blade is formed at the crossing part 8.

Here, "does not substantially contact" means that the relief part does not function to give the desired shape to the sipe blade.

By employing the above construction, the metal mold can be adapted to molding complicated three-dimensional shapes utilizing the fitting (follow-up) characteristics of the sipe blade to the press die at the time of molding, and, hence, it is possible to omit the operation to define the shape of butting part (crossing part) of protrusive shapes (protrusive mountain shape or protrusive dimple) in molding a sipe blade having different three-dimensional shapes which has been troublesome and difficult. Furthermore, it is possible to shorten the time for working the pattern used in making the press die for molding the sipe blade of the present invention, and the production cost of the press die per se can be reduced.

FIGS. 3(b)–3(c) show the case of butting (crossing) of two different three-dimensional shapes, but this can be also suitably applied to the case of three or more different three-dimensional shapes and three or more butting parts (crossing parts).

Figures 4A, 4B, 4C, 4D:
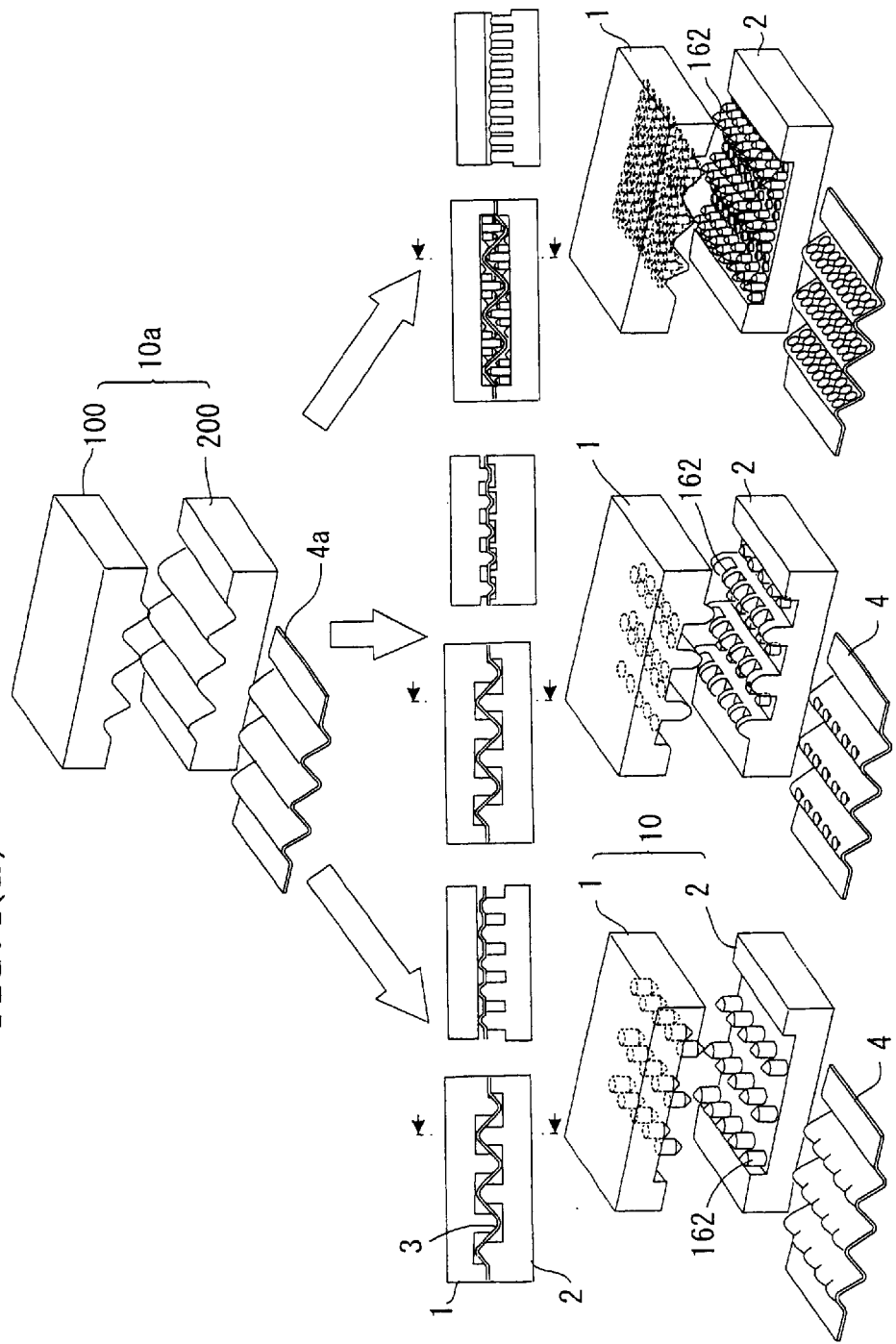
FIG. 4(a), FIG. 4(b), FIG. 4(c) and FIG. 4(d) are schematic oblique views showing another embodiment of the press die for molding a sipe blade of the present invention where the metal mold has a plurality of protruded shape portions to which a load is applied by the molding pressure in contact with the material for sipe blade and which are disposed so that a curved face formed by connecting apexes of the protruded shape portions forms a primary molded shape.

As shown in FIGS. 4(a)–4(d), the press die 10 for molding the sipe blade of the present invention may be such that in correspondence to the shape of the sipe blade, the shapes of the divided parts 1, 2 composing a press die 10 are three-dimensional dented and protruded shapes having a primary molded shape and a secondary molded shape and have a plurality of protruded portions 162 to which a load is applied by the molding pressure in contact with the material 3 for the sipe blade and are disposed so that a curved surface formed by connecting the apexes of the protruded portions 162 forms a primary molded shape (corrugated shape in FIGS. 4(a)–4(d)). FIG. 4(a) shows a conventional sipe blade 4a having a two-dimensional molded shape including only the primary molded shape (corrugated shape). FIG. 4(b) shows a sipe blade 4 having a three-dimensional molded shape to which a secondary molded shape (protruded shape) is also imparted. FIG. 4(c) shows a sipe blade 4 having a three-dimensional molded shape to which a secondary molded shape (dented shape) is also imparted, and FIG. 4(d) shows a sipe blade 4 having a three-dimensional molded shape to which a secondary molded shape (changes of plate thickness) is also imparted. According to the case shown in FIG. 4(d), a sipe blade 4 having a three-dimensional molded shape to which a secondary molded shape (shape of changes of plate thickness) is also imparted can be made by one metal mold (a pair of the divided parts 1, 2 composing a press die 10).

By employing the above construction, it becomes possible to efficiently mold a sipe blade having a complicated shape such as a three-dimensional shape.

The method for making a press die for molding a sipe blade according to the present invention is a method for making the press die 10 for molding a sipe blade as shown in FIGS. 1(a)–1(b) which comprises a pair of the divided parts 1, 2 composing a press die 10, between which a material 3 for sipe blade is interposed and pressed to mold the sipe blade 4 having the desired shape.

The method for making a press die for molding a sipe blade of the present invention comprises forming patterns having a shape that is reverse to the shape of the pair of divided parts composing the press die, and then forming castings from the patterns having a shape reverse to that of the patterns wherein a plurality of patterns having a shape reverse to the shape the pair of divided parts composing the press die are formed so that the portions to which a load is applied by molding pressure in contact with the material for the sipe blade have shapes corresponding to the desired shape of the sipe blade. Further, the portions to which a load is not applied by molding pressure are provided with a first relief part which does not correspond to the desired shape of the sipe blade and does not substantially contact the molded sipe blade. Then castings formed from the patterns have a shape reverse to the shape of the pattern are made, for example, by a casting method. The method will be explained below, referring to FIGS. 5(a)–5(f).

First, as shown in FIG. 5(a), a pattern 11 having a shape that is the reverse of the shape of the pair of divided parts 1, 2 composing a press die 10 is formed, for example, by a machining method (FIGS. 5(a)–5(f) show the case of one of the divided parts 1 that composes the press die 10 of FIGS. 1(a)–1(b)).

That is, a plurality of patterns 11 having a shape reverse to the shape of the pair of divided parts 1, 2 composing a press die 10 as shown in FIG. 5(a) are formed so that, as shown in FIGS. 1(a)–1(b), the shape of the pair of divided parts 1, 2 (which are final objectives) are such that the portion 1a to which a load is applied by a molding pressure in contact with the material 3 for the sipe blade to give the desired shape to the sipe blade 4 has a shape corresponding to the desired shape of the sipe blade 4, and the portion to which no load is applied by molding pressure is provided with a first relief part 5.

In this case, the pattern 11 is preferably formed from materials which are easy in working and stable in size, such as gypsum, various resins (e.g., epoxy resins), metals and the like by a machining method.

Then, a rubber mold 12 having a shape reverse to the shape of the pattern is formed from the pattern 11 as shown in FIG. 5(b). In this case, the rubber mold 12 is preferably formed of a silicone rubber or the like.

Subsequently, as shown in FIG. 5(c), a casting mold 13 having a shape reverse to the shape of the rubber mold 12 is made from the rubber mold 12. In this case, material of the casting mold 13 can be optionally selected depending on the casting alloy (mentioned later) cast in the press die, but a casting mold 13 made of ceramics can be used even when the casting alloy is an iron-based alloy of high casting temperatures.

Then, as shown in FIG. 5(d), a molten metal 15 which is a molten casting alloy is cast in the solidified (fired) casting mold 13 (and a top mold 14 is provided).

In this case, the molten casting alloys include high-strength materials such as tool steels (SK materials, SKD materials, etc.), beryllium copper alloys (BeA275C), etc. Above all, beryllium copper alloys are preferred. When beryllium copper alloys are used, if the material of the sipe blade is a steel material, dragging or seizing to the metal mold hardly occurs to make it easy to carry out the press molding operation of sipe blade.

Then, as shown in FIG. 5(e), the casting mold 13 is removed and a casting 16 is recovered from the casting mold 13 and cut to the desired shape.

Then, as shown in FIG. 5(f), the thus cut casting 16 is subjected to a heat treatment if required, thereby obtaining one of divided parts 1 composing a press die 10. In the same manner, another divided part 2 composing a portion of the press die 10 is made.

As the casting method, there may be employed the above-mentioned ceramic mold method (Shaw process), and other precision casting methods (lost wax process, gypsum casting process), and die cast processes. Furthermore, a sintering method may be employed in place of the casting.

In the method for making a press die for molding sipe blades according to the present invention as shown in FIGS. 5(a)–5(f), there is shown the case where the first relief part 5, which does not substantially contact the sipe blade, has a depth equal to or greater than the height of the protruded shape of the opposing portions of the divided parts 1 and 2 composing the press die 10 and further comprises a groove 5a having a bottom surface that is horizontal to the surface of the material 3 for the sipe blade as shown in FIGS. 1(a)–1(b), namely, the case where the pattern has a shape reverse to the shape of the press die 10.

Moreover, in the method for making a press die for molding a sipe blade according to the present invention as shown in FIGS. 5(a)–5(f), there is shown the case where the shape of the portions 1a and 2a to which a load is applied by the molding pressure in contact with the material 3 has a protruded shape and the shape of the portions to which a load is not applied by the molding pressure has a dented shape so as to give a three-dimensional dented and protruded shape to the pair of divided parts 1, 2 composing a press die 10 in correspondence to the shape of the sipe blade 4 as shown in FIGS. 1(a)–1(b), namely, the case where the pattern has a shape that is reverse of the shape of a pair of divided parts 1, 2 composing a press die 10.

The method for making a press die for molding sipe blade according to the present invention may be such that a plurality of protruded portions 162 to which a load is applied by the molding pressure in contact with the material 3 for the sipe blade are formed and simultaneously apexes of protruded portions 162 are disposed so that a curved face formed by connecting the apexes forms a primary molded shape (corrugated shape in FIGS. 4(a)–4(d)) so as to give a three-dimensional dented and protruded shape to a pair of divided parts 1, 2 composing a press die 10 in correspondence to the desired shape of the sipe blade as shown in FIGS. 4(a)–4(d).

As mentioned above, in the method for making a press die for molding a sipe blade according to the present invention, only the protruded shape portion (protruded mountain portion or protruded dimple portion) which contacts the sipe blade and which is difficult to work by machining method is worked to a pattern of reversal shape, and the dented shape portion (dented valley portion or dented dimple portion) is relieved to a readily workable shape (a relief part is formed or in some cases without carrying out working) to form a reversal shape pattern. That is, since it is difficult to directly make the metal mold by machining methods per se or the like even if a relief part is formed, the present invention makes it possible to efficiently mold a sipe blade having a complicated shape such as a three-dimensional shape by utilizing the casting method which uses a pattern having a shape reverse to that of the press die for molding and, further, utilizing the fitting (follow-up) characteristics to the press die at the time of molding of the sipe blade.

Figure 6A:
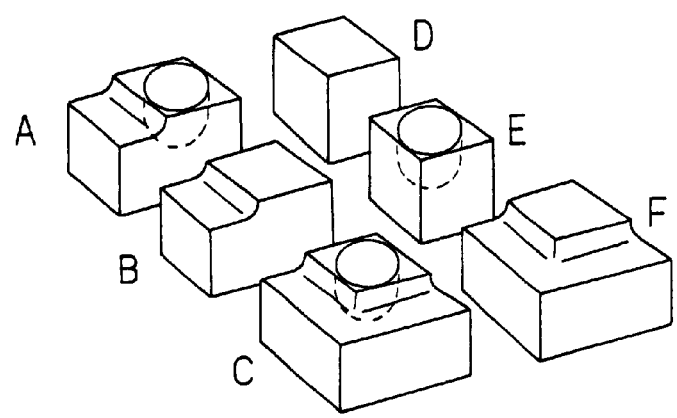
FIG. 6(a), FIG. 6(b), and FIG. 6(c) are schematic oblique and explanatory views which show another embodiment of a method for making a press die for molding a sipe blade of the present invention where a pattern is constructed from pattern parts A–F.
Figure 6B:
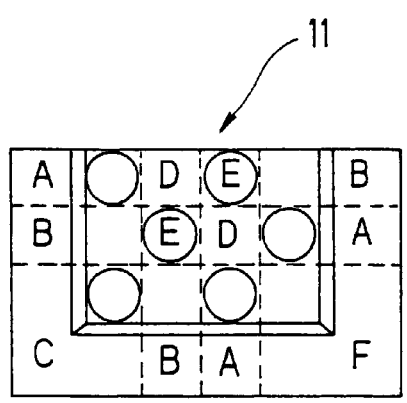
Figure 6C:
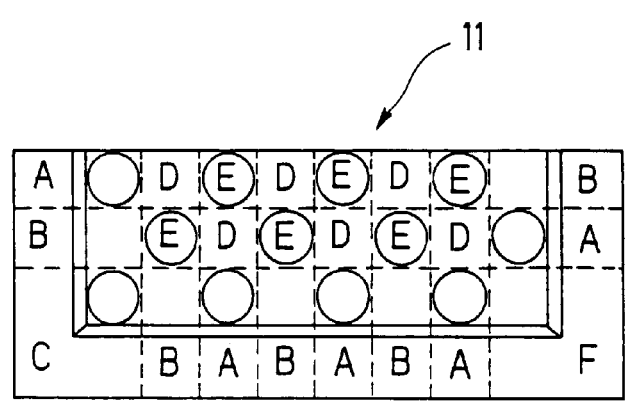

As shown in FIGS. 6(a)–6(c), in the method for making the press die for molding a sipe blade according to the present invention, so as to be able to optionally provide sipe blades having a plurality of shapes, a plurality of pattern parts A–F divided into basic shapes commonly included in the plurality of the shapes are previously prepared and these pattern parts A–F may be optionally combined to construct the pattern 11. FIG. 6(a) shows the case where six kinds of pattern parts A–F of basic shapes are made.

As mentioned above, FIG. 6(a) shows the case where six kinds of pattern parts A–F of basic shapes are made, and in this case, each of the plurality of the pattern parts may be individually made or they may be made by working one by one and each of them is duplicated, thereby making a plurality of the pattern parts.

FIG. 6(b) shows respectively the case of combining 3 pattern parts A, 3 pattern parts B, 1 pattern part C, 2 pattern parts D, 2 pattern parts E, and 1 pattern part F, thereby forming the pattern 11. FIG. 6(c) shows the case of combining 5 pattern parts A, 5 pattern parts B, 1 pattern part C, 6 pattern parts D, 6 pattern parts E, and 1 pattern part F, thereby forming the pattern 11.

By constructing as above, patterns can be efficiently made for making press dies differing in the number of molded protruded portions. Moreover, by previously making pattern parts of various basic shapes, patterns can be rapidly completed only by combining (fabricating) them as necessary. Moreover, only the pattern is formed by such combination, and the press die per se can be made by the above-mentioned casting method using the pattern. Therefore, the press die for molding a sipe blade can have a continuous shape, and the problems in strength can also be solved, being different from conventional methods (where metal molds for molding are fabricated).

Furthermore, as shown in FIGS. 3(a)–3(c), the method for making the press die for molding a sipe blade according to the present invention may be such that shapes of a plurality of the divided parts composing a press die 10 do not faithfully correspond to a plurality of different three-dimensional shapes of the sipe blade 4 which are continuously integrated, but the shape of a pair of the divided parts composing a press die 10 individually have a discontinuous shape and independently maintain a plurality of three-dimensional shapes 6 and 7 of the sipe blade 4, and simultaneously a second relief part 9 which does not substantially contact the material for sipe blade is formed at the crossing part 8, and patterns are formed corresponding thereto.

Moreover, according to the method for making a press die for molding a sipe blade according to the present invention, a press die for molding a sipe blade having primary molded shape (minimum dented and protruded shape) and additionally secondary molded shape (molded shape greater in wavelength than the primary molded shape) can be easily reproduced by a single shape of metal mold.

That is, in the method for making a press die for molding a sipe blade according to the present invention, from a pattern or combination of pattern pieces, a first reversal mold having a shape that is the reverse of the shape of the pattern is formed, a first sipe blade replica comprising an easily to mold material, such as sheet wax, is molded using the resulting reversal mold, a second shape is imparted to this first sipe blade replica using a given mold to form a second sipe blade replica having both the first shape and the second shape. A pair of second reversal molds having a shape that is the reverse of the shape of the second sipe blade replica are formed using the second sipe blade replica, and a casting having both the first shape and the second shape can be formed from the second reversal mold using a casting method. Further detailed explanation will be made below, referring to FIGS. 7(a)–7(b).

First, as shown in FIG. 7(a), a pattern 11 having a first shape 21 which is reverse to the primary molded shape of the objective final metal mold is made by a machining method. In this case, the pattern 11 is preferably made of materials easy in working and stable in size, such as gypsum, various resins (e.g., epoxy resins) and metals by a machining method.

Then, as shown in FIG. 7(b), a first reversal mold 22 having the first shape is formed. In this case, the first reversal mold 22 is preferably made of, for example, gypsum, various resins (e.g., epoxy resins), etc.

Then, as shown in FIG. 7(c) and FIG. 7(d), a first sipe blade replica 23 comprising an easy to mold material such as sheet wax and having the first molded shape is molded from the first reversal mold 22. This first sipe blade replica 23 has protruded shape 23a and dented shape 23b. In this case, the first sipe blade replica 23 preferably has the same thickness as the sipe blade, and suitable materials thereof include, for example, thermosetting resins, sheet waxes, lead sheets, etc.

Then, as shown in FIG. 7(e) and FIG. 7(f), using a mold 24 for molding a secondary molded shape, a second shape corresponding to the secondary molded shape is imparted to the first sipe blade replica 23, and a second sipe blade replica 25 having both the first shape and the second shape is molded. In this case, the molding mold 24 for the secondary molded shape may be a gauge, and, besides, there is no need to use top and bottom molds and only one of them may be used. Preferred materials for the mold 24 for molding the secondary molded shape are, for example, gypsum, various resins (e.g., epoxy resins), etc.

Then, as shown in FIG. 7(g), gypsum, a resin (e.g., epoxy resins) or the like is cast on one side of the second sipe blade replica 25 to back the replica, and the outer periphery is skived to provide a backing material 26.

Then, as shown in FIG. 7(h), a rubber material is disposed on another side of the second sipe blade replica 25 on the backing material 26 to form a rubber mold 27 for a top mold.

Then, as shown in FIG. 7(i), disjointing of the backing material 26 is carried out in such a state as the second sipe blade replica 25 being disposed on the rubber mold 27 for a top mold, and a rubber material is disposed thereon to form a rubber mold 28 for a bottom mold.

Then, as shown in FIG. 7(j), the second sipe blade replica 25 is removed to obtain a pair of second reversal molds having both the first shape and the second shape (rubber mold 27 for top mold and rubber mold 28 for bottom mold).

In accordance with the steps of FIG. 5(c) and the following, a metal casting having both the first shape and the second shape (metal mold for molding a sipe blade) can be formed from the second reversal mold (rubber mold 27 for top mold and rubber mold 28 for bottom mold) using a casting method.

By the above construction, a press die having both the primary molded shape and the secondary molded shape can be simply made by the casting method.

Figure 8A:
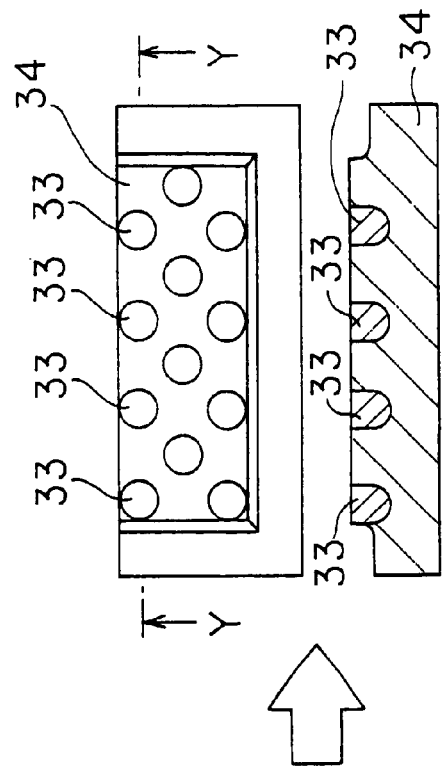
FIG. 8(a) and FIG. 8(b) are schematic oblique and explanatory views which show another embodiment of a method for making a press die for molding a sipe blade of the present invention where a press die for molding a sipe blade which has smaller number of protruded shapes than the number of dented shapes which the pattern, etc. have.
Figure 8B:
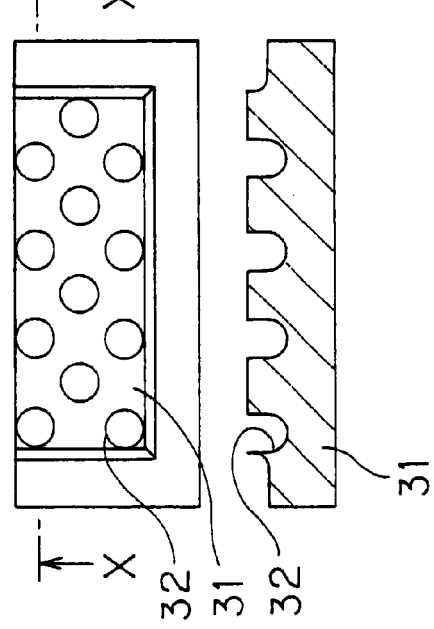

Furthermore, as shown in FIGS. 8(a)–8(b), using the pattern 11 (see FIGS. 5(a)–5(f)) obtained in the intermediate stage of the aforementioned method, the second reversal molds 27, 28 (see FIGS. 7(h)–7(i)), or combination thereof (pattern 31, etc.), a press die for molding a sipe blade having protruded shapes which correspond to dented shapes 32 of the pattern 31 and which are smaller in the number than the number of the dented shapes 32 is made, and the dented shape portion 32 of the pattern 31 is filled with a filler 33 so that the surface of the pattern 31 is in one plane with the dented shape portions 32, thereby forming a new pattern 34 and a casting having a shape reverse to the shape of this new pattern 34 can be formed from the new pattern 34.

Here, as the filler 33, mention may be made of gypsum, various resins (e.g., epoxy resins), clay, etc.

By the above construction, the time required for making the pattern can be shortened, and, besides, the new pattern 34 can be easily restored to the former pattern 31 by removing the filler 33 and can be used repeatedly. Thus, cost can be reduced.

On the other hand, in the case of disposing a plurality of different three-dimensional shapes in the same sipe blade, the sipe blade is sometimes distorted due to the difference in spreading length of the molded shapes at the time of press molding of the sipe blade.

For solving this problem, the drawn shape (peripheral shape) of the material of sipe blade (plane) can be set in the state of estimating the distorting portion, but requires experiential values by troublesome experiments and the like.

Therefore, if possible, the peripheral shape may be trimmed (to cut) after press molding, but in case the peripheral shape is made by physical exterior force of cutting die (trimming die), it is very difficult to reproduce all of the surface shapes in the vicinity of the peripheral portion of the sipe blade by cutting die as reversal shapes. As other methods, it is considered to perform cutting by directional energy such as laser cutting, but in this case, there is a limit in irregular shape which can be followed up, and, besides, a great expense is necessary and this is not practical from the point of cost.

The method for making a trimming die for trimming a sipe blade according to the present invention has been accomplished in view of the above problems.

That is, as shown in FIGS. 9(a)–9(f), the method for making a trimming die for trimming a sipe blade according to the present invention is a method for making a trimming die for trimming a sipe blade (trimming die) having a desired shape from a sipe blade rough mold (not shown) which is larger in size than the shape 41 to be trimmed (necessary peripheral shape) (see FIG. 9(a)). A third sipe blade replica 42 (see FIG. 9(a)) that is larger than the sipe blade comprising an easy to mold material, such as sheet wax, is molded from one of the pattern 11 (see FIGS. 5(a)–5(e)) formed in the intermediate stage of the aforementioned method, the first reversal mold 22 and the mold 24 for the secondary molded shape (see FIGS. 8(a)–8(b)), or a combination thereof (the reversal pattern, etc.). A pair of third reversal molds (rubber molds) 43 and 44 are made using the third sipe blade replica 42 and the backing material 26 (FIG. 9(b)–9(e)), and a metal mold 45 for trimming (trimming die; inner mold 45a, outer mold 45b) is formed using the third reversal molds 43 and 44 by a casting method (FIG. 9(f)).

In the case of having no secondary molded shape, the step for the secondary molding is unnecessary.

By employing the above construction, even when the sipe blade rough mold to be trimmed has a relief shape part, a trimming die having a proper shape can be simply made.

Figure 10A:
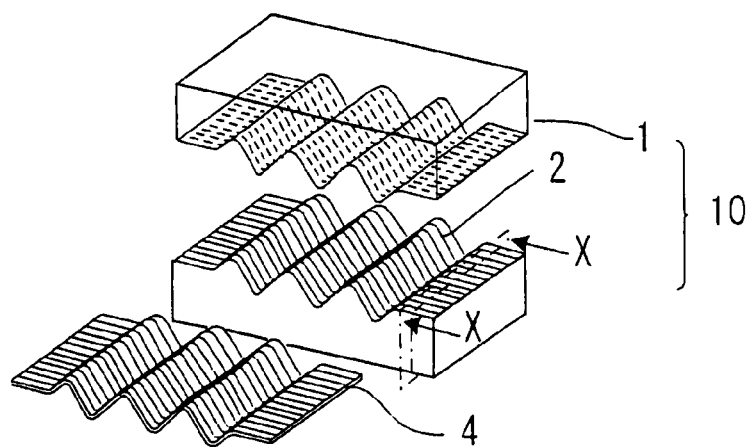
FIG. 10(a) and FIG. 10(b) are schematic oblique and explanatory views which show a press die for molding a sipe blade and the sipe blade obtained by another embodiment of a method for making a press die for molding a sipe blade of the present invention.
Figure 10B:
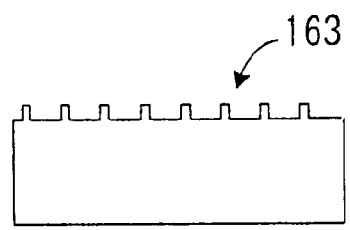

The method for making a press die for molding sipe blade according to the present invention may be a method in which a press die 10 for molding sipe blade comprising a pair of divided parts 1, 2 composing a press die 10, between which a material for sipe blade is interposed and pressed to mold a sipe blade having a desired shape, is made by forming a pattern having a shape reverse to the shape of the pair of the divided parts 1, 2 composing a press die 10 and then forming a casting having a shape that is the reverse of the pattern. The portion of the pattern corresponding to the dented and protruded shape 163 in the secondary molded shape of the pair of the divided parts 1, 2 composing a press die 10 is formed by using a cutter mark in a chemical molding method, for example, chemical etching, a physical corrosion method or a machining method so that the pair of the metal molds 1 and 2 have a three-dimensional dented and protruded shape having a primary molded shape (the corrugated shape in FIG. 10(a)) and a secondary molded shape provided with the dented and protruded shape 163 (see FIG. 10(b) which is a sectional view taken along plane X of FIG. 10(b)). From the resulting press die for molding sipe blade, the sipe blade 4 shown in FIG. 10(a) can be molded.

The above method will be specifically explained using FIGS. 11(a)–11(i), which are sectional views showing the order of steps employing a chemical molding method (chemical etching). First, a basic pattern 164 of the primary molded shape which is the reversal shape of the press die for molding sipe blade is formed (FIG. 11(a)). In this case, materials of the pattern 164 are not limited as far as they can be chemically etched, and examples thereof are aluminum alloys, steel materials, copper alloys, etc. Then, the area where the protruded portion of the dented and protruded shape on the surface of the pattern 164 is formed is subjected to masking with mask 165 (FIG. 11(b)). Then, the pattern 164 having the masking on the desired area of the surface is dipped in an etching solution 165a to remove by dissolution the area which is not masked (area which forms dented shape) (FIG. 11(c)). Then, the mask 165 is peeled off to obtain a pattern 166 on which a dented and protruded shape 163 is formed (FIG. 11(d)). Then, a rubber mold 167 having a shape reverse to the dented and protruded shape of the pattern 166 is formed (FIG. 11(e)). Subsequently, a casting mold 168 having a shape reverse to that of the rubber mold 167 is formed (FIG. 11(f)). Then, casting is carried out, and a molten metal is cast in the casting mold 168 to form a casting 169 which is reverse to the casting mold 168 (FIG. 11(g)). Then, the top 170 of the casting 169 is removed from the casting 169 to obtain a product 171 (FIG. 11(h)) which is heat treated(h). In this way, a press die 10 for molding sipe blade which has dented and protruded shape 163 can be completed (FIG. 11(i)).

Thus, a secondary molded shape (e.g., having a complicated geometrical dented and protruded shape caused by the change in plate thickness) can also be imparted to a curved surface having primary molded shape (e.g., corrugated shape) with maintaining a high degree of freedom.

Furthermore, the method for making a press die for molding a sipe blade according to the present invention can be applied not only to the formation of the geometrical shape obtained by change in plate thickness, but also to the formation of shapes of natural objects such as leather, rocky and leaf patterns by the change in plate thickness.

As other methods for imparting a secondary molded shape (such as dented and protruded shape formed by complicated geometrical change in plate thickness) to the basic pattern, physical corrosion methods such as a sand blast method may be used though the accuracy of the shape obtained by chemical etching cannot be expected.

Figures 12A, 12B, 12C:
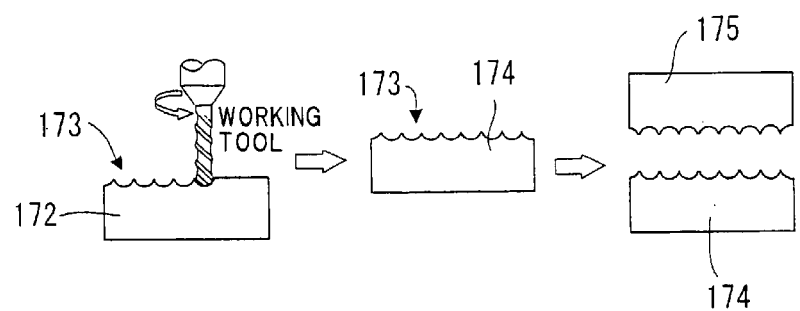
FIG. 12(a), FIG. 12(b), and FIG. 12(c) are schematic sectional views which show the order of steps of the method explained referring to FIG. 10(a) and FIG. 10(b) where a cutter mark formed in machining of a material of the pattern is used.

Furthermore, though the degree of freedom of obtaining shapes will be lower than the above methods, by positively utilizing a cutter mark 173 formed in machining of the pattern material 172 (FIG. 12(a)), a secondary molded shape (dented and protruded shape) is imparted to the basic pattern and worked to obtain a pattern 174 (FIG. 12(b)), and then the pattern is worked and thereafter a rubber mold 175 reverse to the pattern 174 may be formed (FIG. 12(c)). The subsequent steps are the same as the step of FIG. 11(f) and the following.

Figures 13A, 13B, 13C:
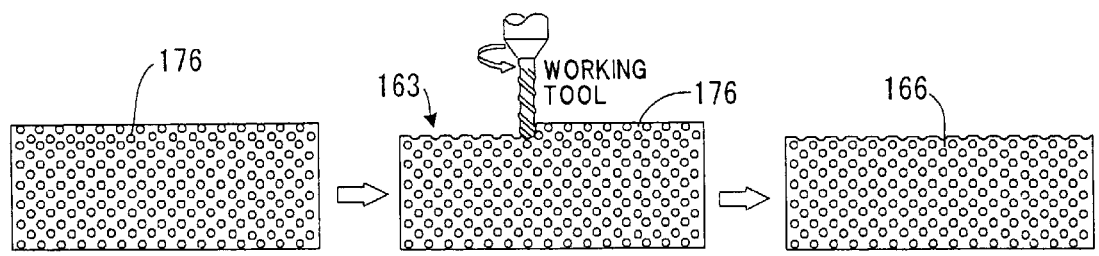
FIG. 13(a), FIG. 13(b), and FIG. 13(c) are schematic sectional views which show the use of a porous material as a material of the pattern in the method explained referring to FIG. 10(a) and FIG. 10(b).

Moreover, the method for making a press die for molding a sipe blade according to the present invention may be such that so as to give a three-dimensional dented and protruded shape having a primary molded shape and a secondary molded shape provided with dented and protruded shape to the above-mentioned pair of divided parts composing a press die, a porous material is used as a material of the pattern (pattern material) (FIG. 13(a)) and the portion of a porous pattern 176 corresponding to the dented and protruded shape in the secondary molded shape of the pair of the divided parts composing a press die is cut, for example, by a working tool to expose a dented and protruded shape 163 to form a pattern 166 with dented and protruded shape, and as the subsequent steps, the same steps as those of FIG. 11(e) and the following are employed.

By using the above construction, the shape formed by the change in plate thickness can be simply obtained.

The above-mentioned press die for molding a sipe blade and the sipe blade for the metal mold for molding tires which is produced by the production method according to the present invention are excellent in accuracy of size and have beautiful appearance even in the case of complicated shape such as three-dimensional shape.

The sipe blade for a tire mold according to the present invention is preferably such as having a conventional two-dimensional molded sipe shape of −5 mm in ½ pitch and 1–5 mm in amplitude of a primary molded shape (e.g., corrugated shape) as a basic shape, to which a two-dimensional or three-dimensional molded shape of smaller pitch of 0.05–2.5 mm in ½ pitch and 0.05–2.5 mm in amplitude of secondary molded shape is imparted.

Specific examples of a sipe blade for a tire mold of the present invention will be explained below.

SPECIFIC EXAMPLE 1

As Specific Example 1 of a sipe blade for a tire mold of the present invention, mention may be made of one which has a two-dimensionally definable primary molded shape, in which is present a two-dimensionally definable secondary molded shape which does not involve a change in plate thickness and is smaller than the primary molded shape.

Figure 14A:
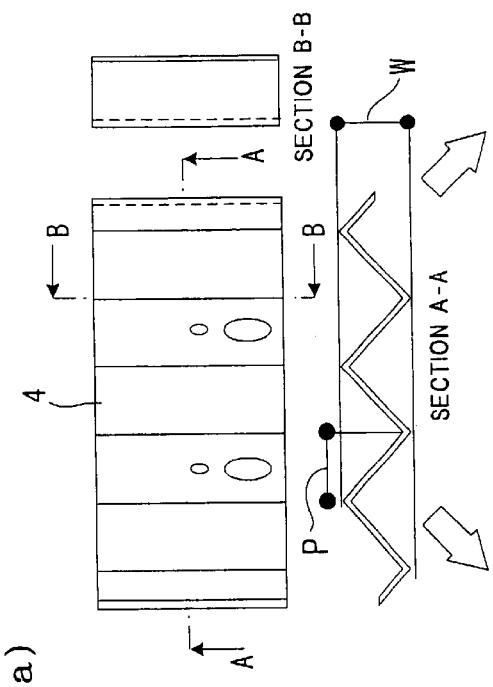
FIG. 14(a), FIG. 14(b), and FIG. 14(c) are explanatory and sectional views which schematically show Specific Example 1 of the sipe blade for a tire mold of the present invention.
Figure 14C:
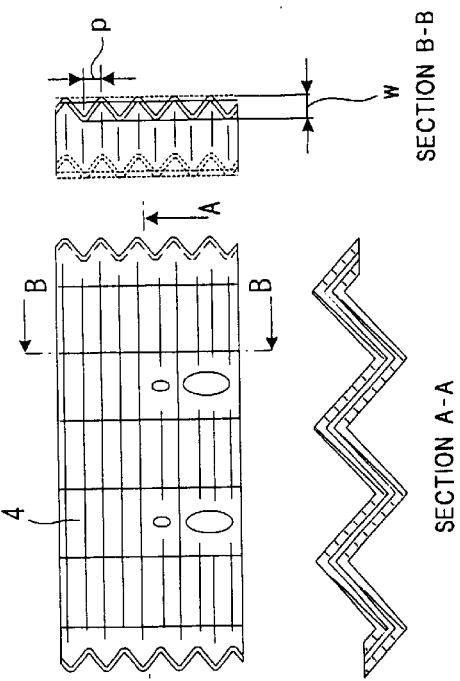
Figure 14B:
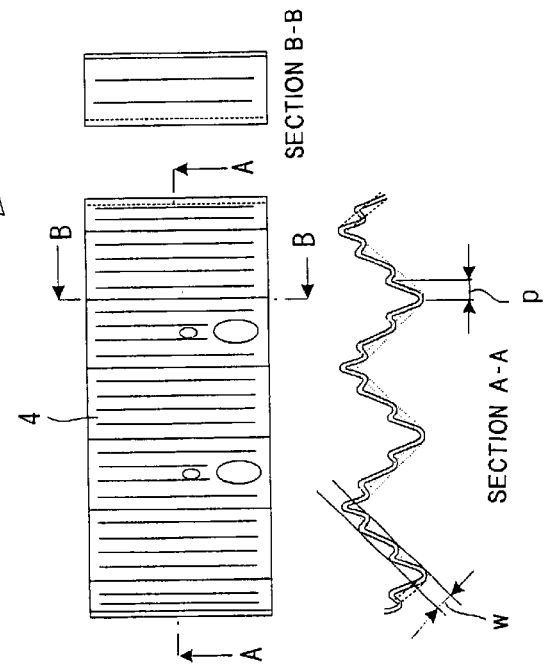

In this case, as to the sipe blade 4, as shown in FIGS. 14(a)–14(c), the ½ pitch p and the amplitude w of the secondary molded shape are preferably set in the following ranges in respect to the ½ pitch P and the amplitude W of the primary molded shape:

$$P/20 \leq p \leq P/2 \qquad (1); \text{ and}$$

$$W/20 \leq w \leq W/2 \qquad (2).$$

The impartation orientation of the secondary molded shape may be either the impartation of the secondary molded shape to the section A—A as shown in FIG. 14(b) or the impartation of the secondary molded shape to the section B—B as shown in FIG. 14(c), and, besides, the secondary molded shape may be imparted with inclination. In the case of imparting the secondary molded shape to the section B—B, it is preferred that it is not imparted to the cast-in portion for easy drawing of the sipe blade from the tire mold at the time of repairing of the tire mold.

Figure 15A:
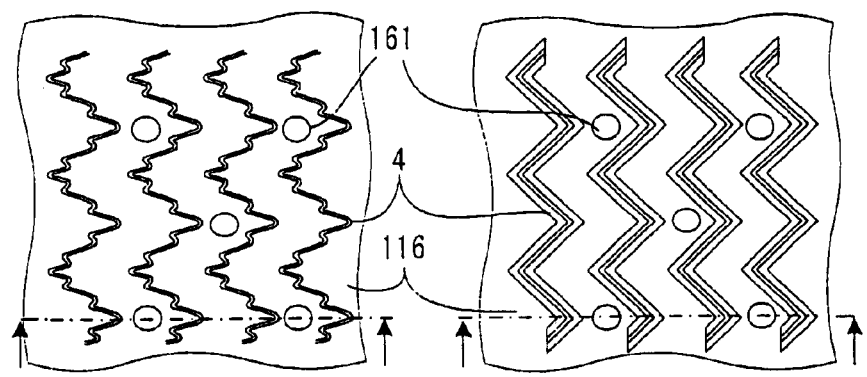
FIG. 15(a) is an explanatory schematic view and FIG. 15(b) is a sectional view; each of which schematically shows that the sipe blade for a tire mold shown in FIG. 14(a), FIG. 14(b)
Figure 15B:
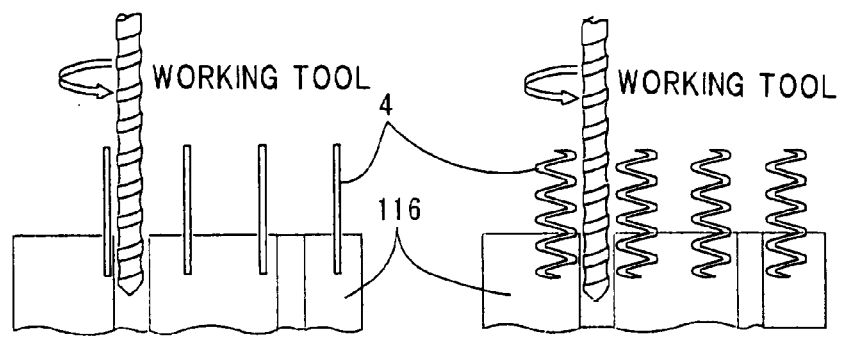

By employing the above construction, as shown in FIGS. 15(a)–15(b), it becomes easy to avoid interference by a working tool at the time of making vent holes 161 of the sipe blade molding press die 10 which has been a problem in the past for conventional three-dimensional molded shape, and, furthermore, the section modulus of the sipe blade 4 can be maintained at a high numerical value as a whole.

SPECIFIC EXAMPLE 2

As Specific Example 2 of a sipe blade for a tire mold of the present invention, mention may be made of one which has a two-dimensionally definable primary molded shape, in which is present a two-dimensionally definable secondary molded shape which involves a change in the plate thickness and which is smaller than the primary molded shape.

As shown in FIGS. 16(a)–16(c) and FIGS. 17(a)–17(b) (FIG. 17(a) is an enlarged view of the portion A of the sipe blade 4 shown in FIG. 16(b) and FIG. 17(b) is an enlarged view of the portion B in FIG. 16(c))). A groove width wg, groove depth d and ungrooved section (ligament) wl in the secondary molded shape formed by the change in plate thickness are preferably set within the following ranges in respect to the ½ pitch P and the amplitude W of the primary molded shape and plate thickness (thickness of sipe blade) T.

$$0.05 \leq wg \leq [(P^2+W^2)^{1/2}]/2 \quad (3);$$

$$0.05 \leq wl \leq [(P^2W^2)^{1/2}]/2 \quad (4); \text{ and}$$

$$0.05 \leq d \leq T/3 \quad (5).$$

The impartation orientation of the secondary molded shape may be either the impartation of the secondary molded shape to the section C—C as shown in FIG. 16(b) or the impartation of the secondary molded shape to the section D—D as shown in FIG. 16(c), and, besides, the secondary molded shape may be imparted with inclination. Furthermore, as shown in FIGS. 17(a)–17(b), the secondary molded shape may be disposed either by synchronization of various shapes or by shifting of phases as in (i)–(iv). In the case of imparting the secondary molded shape to the section D—D, it is preferred that it is not imparted to the cast-in portion for easy drawing of the sipe blade from the tire mold at the time of repairing of the tire mold.

By employing the above construction, the sipe blade of Specific Example 2 is larger than that of Specific Example 1 in the proportion of the primary molded shape in the whole shape of the sipe blade, and, hence, the former sipe blade can be used in the similar manner to the conventional sipe blade having a two-dimensional molded shape and can provide tires improved in performance without damaging flexural strength.

As methods for molding the sipe blade of Specific Example 2, mention may be made of two methods, namely, a method of press molding by a bender (a method of making primary and secondary molded shapes at a stretch by a press) and a method of previously imparting the secondary molded shape to the sipe blade material (plate material) by grinding, chemical etching, blasting or the like and press molding it by a metal mold for imparting the primary molded shape. When the secondary molded shape is imparted to the sipe blade material by chemical etching or blasting, it is preferred to carry out the chemical etching or blasting with masking the portions which should not be made thin in thickness.

SPECIFIC EXAMPLE 3

As Specific Example 3 of a sipe blade for a tire mold according to the present invention, mention may be made of one which has a two-dimensionally definable primary molded shape, in which is present a two-dimensionally undefinable secondary molded shape which does not involve change in plate thickness and is smaller than the primary molded shape.

In this case, as to the sipe blade 4 shown in FIGS. 18(a)–18(d), the widths we and wf and depth d of the secondary molded shape are preferably set within the following ranges in respect to the ½ pitch P and the amplitude W of the primary molded shape and plate thickness (thickness of the sipe blade) T:

$$2T \leq we, wf \leq P/2 \quad (6); \text{ and}$$

$$2T \leq d \leq W/2 \quad (7).$$

Figures 18A, 18B, 18C, 18D:
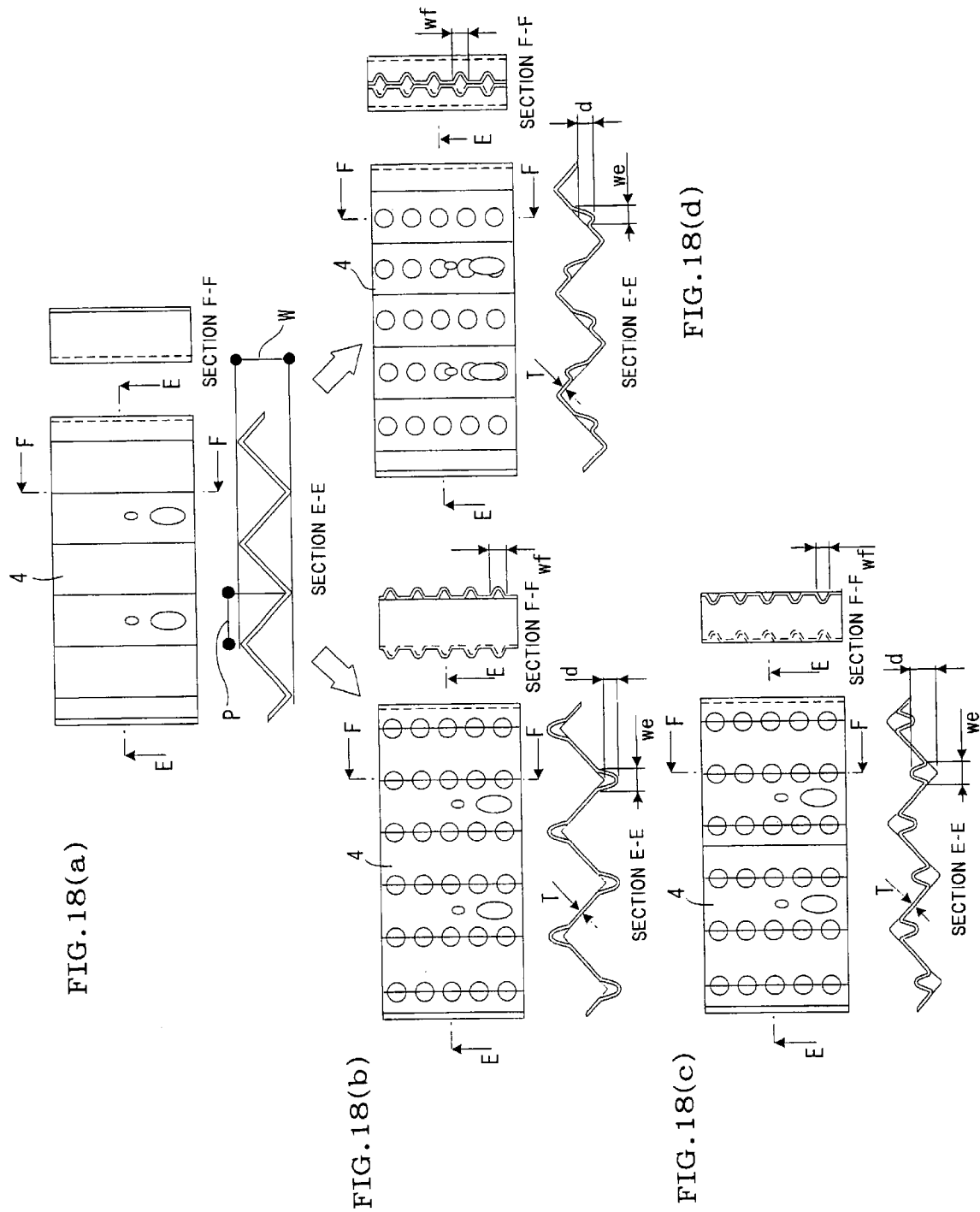
FIG. 18(a), FIG. 18(b), FIG. 18(c) and FIG. 18(d) are explanatory and sectional views which schematically show Specific Example 3 of the sipe blade for a tire mold of the present invention.

The impartation orientation of the secondary molded shape may be any of the impartation of the secondary molded shape (protruded shape) to the section E—E as shown in FIG. 18(b), the impartation of the secondary molded shape (dented shape) to the section E—E as shown in FIG. 18(c) and the impartation of the secondary molded shape to the section F—F, and, besides, the secondary molded shape may be imparted to the inclined part (see FIG. 18(d)). In the case of imparting the secondary molded shape to the section F—F, it is preferred that it is not imparted to the cast-in portion for easy drawing and insertion of the sipe blade from the tire mold at the time of repairing of the tire mold.

Figure 19C:
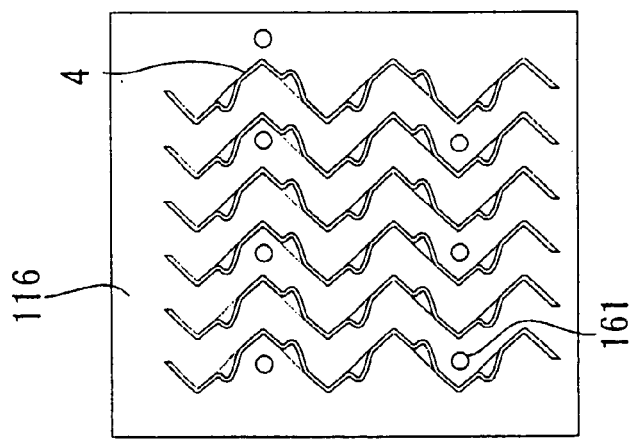
FIG. 19(a), FIG. 19(b), and FIG. 19(c) are explanatory and sectional views which schematically show that the shape of the sipe blade for a tire mold shown in FIGS. 18(a)–18)d_should be set so as to be able to avoid interference with the metal mold at the time of working of vent holes.
Figure 19B:
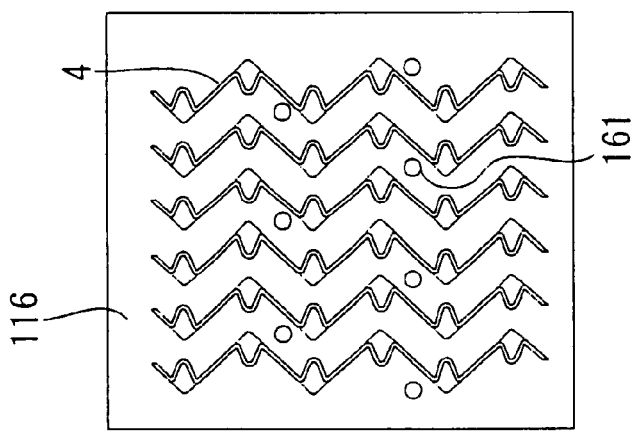
Figure 19A:
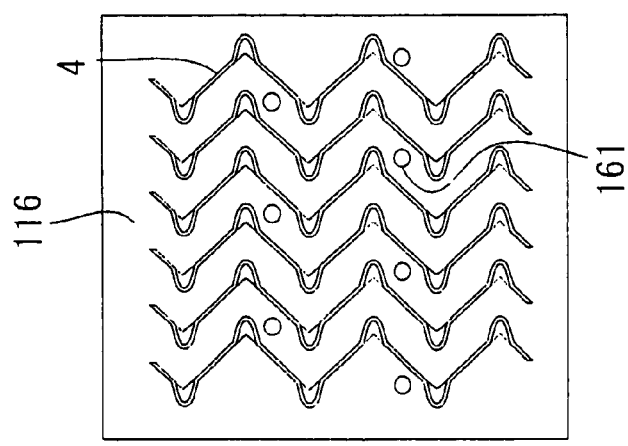

The secondary molded shape may be formed with changing the directions of dent and protrusion as shown in FIGS. 18(b)–18(d), but it is preferred that spaces are formed between sipe blades 4 of various shapes shown in FIGS. 19(a)–19(c) in which vent holes 161 can be made in the case of making vent holes 161 in the tire mold.

SPECIFIC EXAMPLE 4

As Specific Example 4 of a sipe blade for a tire mold of the present invention, mention may be made of one which has a two-dimensionally definable primary molded shape in which is present a two-dimensionally definable secondary molded shape which is formed by the change in the plate thickness and is smaller than the primary molded shape.

Figure 20A:
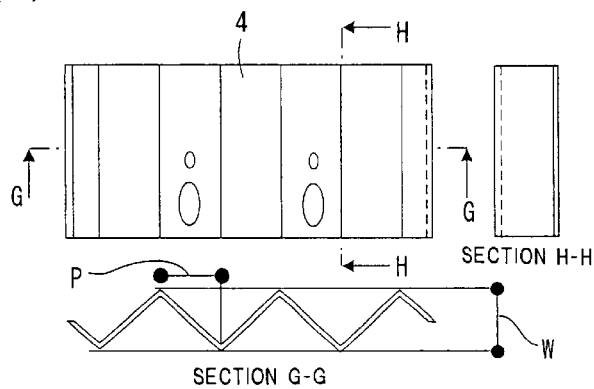
FIG. 20(a), FIG. 20(b), and FIG. 20(c) are explanatory and sectional views which schematically show Specific Example 4 of the sipe blade for a tire mold of the present invention.
Figure 20B:
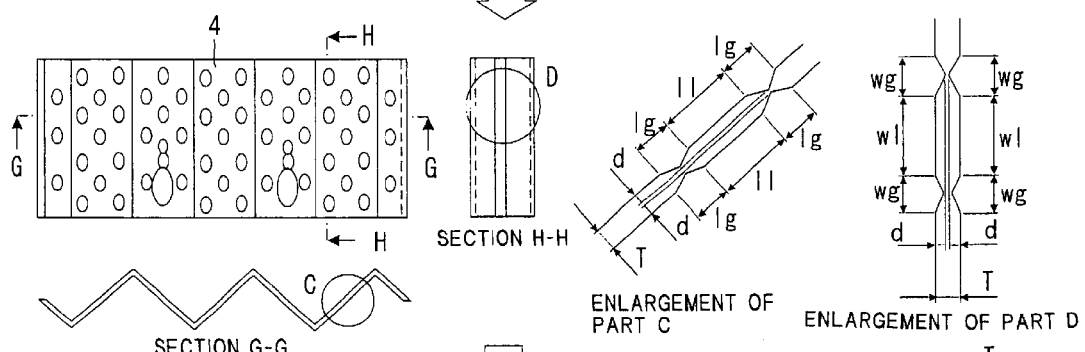
Figure 20C:
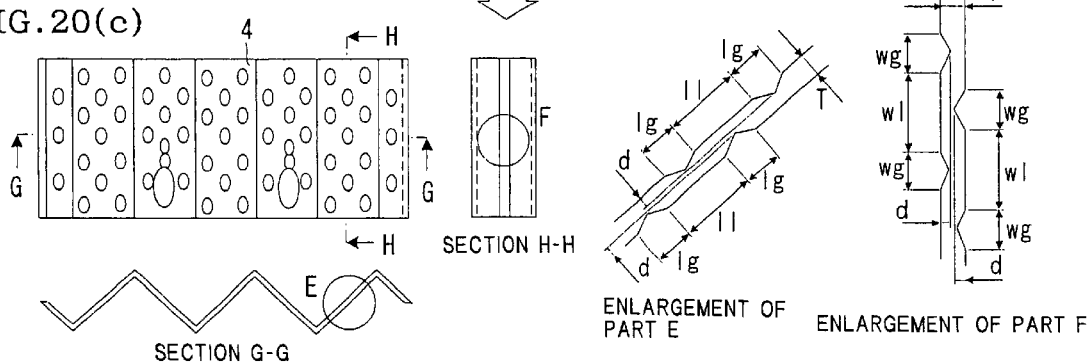

In this case, as to the sipe blade 4 shown in FIGS. 20(a)–20(c), the groove width lg and wg, groove depth d and ungrooved sections (ligament) ll and wl in the secondary molded shape formed by the change in plate thickness are preferably set within the following ranges in respect to the 1/2 pitch P and the amplitude W of the primary molded shape and plate thickness (thickness of sipe blade) T:

$$0.05 \leq lg, wg \leq [(P^2+W^2)^{1/2}]/2 \quad (8);$$

$$0.05 \leq ll, wl \leq [(P^2+W^2)^{1/2}]/2 \quad (9)$$

$$0.05 \leq d \leq T/3 \quad (10).$$

The impartation orientation of the secondary molded shape may be either the impartation of the secondary molded shape (such changes in plate thickness as the groove widths lg, wg and the ungrooved sections (ligaments) ll, wl being opposed to each other) to the section G—G and the section H—H as shown in FIG. 20(b) or the impartation of the secondary molded shape (such changes in plate thickness as the groove widths lg, wg and the ungrooved sections (ligaments) ll, wl being alternately opposed) to the section G—G and the section H—H as shown in FIG. 20(c). In the case of imparting the secondary molded shape to the section H—H, it is preferred that it is not imparted to the cast-in portion for easy drawing and insertion of the sipe blade from the tire mold at the time of repairing of the tire mold.

Figure 21:
FIG. 21 is an explanatory view which schematically shows an example of the secondary molded shape of the sipe blade for a tire mold shown in FIGS. 20(a)–20(c).

Furthermore, the secondary molded shape is not limited to the conical dented shape as shown in FIGS. 20(b)–20(c), but can also have a hemispherical dented shape, hemicylindrical dented shape, quadrangular pyramid dented shape (diamond cut shape), etc., as shown in FIG. 21.

Molding of the sipe blade of Specific Example 4 may be carried out by embossing of the plate-like material before the formation of the primary molded shape or by chemical etching or sand blasting. Alternatively, press molding may be carried out at one time using a metal mold having combined primary molded shape and secondary molded shape which is made by casting method using the methods shown in FIG. 10(a) to FIG. 13(c).

The tire mold which is formed using such a sipe blade can mold tires further improved in performances such as gripping power and the like.

EXAMPLES

The present invention will be explained in more specifically using the following examples, which should not be construed as limiting the invention in any manner.

Example 1

A pattern 51 for a press die having the shape as shown in FIGS. 22(*a*)–22(*e*) was prepared, and the press die for molding sipe blade was made through casting by ceramic mold method. Here, a synthetic wood (chemiwood material) was used as a material of the pattern, a silicone rubber (trade name: TSE350 manufactured by Toshiba Silicone Co., Ltd.) was used as a material of the rubber mold, a ceramic casting mold material with ethyl silicate 40 as a binder was used as a material of the mold for casting (Shaw process mold for casting), and beryllium copper alloy (BeA275C) was used as the casting alloy.

The size of the pattern 51 was enlarged by 20/1000 equally in all axes taking the shrinkage caused by the casting into consideration. Furthermore, the size in FIGS. 22(*a*)–22 (*e*) shows an aimed size of a completed final metal mold. As the casting method, general Shaw process was employed. In this way, a casting having a shape reverse to the shape of the pattern 51 could be made at a high accuracy.

The resulting casting was subjected to a solution heat treatment of 800° C. for 3 hours and then an aging treatment of 360° C. for 3 hours, and this was used in the state of a hardness HRC of 40 as a press die for molding sipe blade.

SUS304 (stainless steel) of 0.3 mm thick was used for pressing, and using the press die for molding, press molding was carried out under a pressure of 10 tons, and as a result, there could be molded a three-dimensional molded sipe blade having good bent shape which was a combined type of dented and protruded dimple shape zigzag disposition and triangular bent mountain shape without causing scoring and tearing. Distortion of the blade at the press molding was removed by correcting in drawn shape.

The shape at the butting part (crossing part) of the dented and protruded dimple shape and the triangular bent mountain shape smoothly shifted and there was no problem in quality.

The peripheral shape of the molded sipe blade was 15×60 mm. For one sipe blade, a three-dimensional molded shape was formed having 30 triangular bent mountains and 88 dimple mountains.

Comparative Example 1

It was attempted to make a press die for molding having the same shape as of Example 1 by machining method, but it could not be made. That is, the dented and protruded shape was too small, and the problem of interference by working tool occurred.

Example 2

A press die for molding was made in the same manner as in Example 1, using the pattern used in Example 1 in which the dented shape (dented dimple shape) of 5 rows in the central part and the dented portions (grooves) of the triangular bent mountain shape of 3 rows were filled with gypsum to make the surface in plane state.

In this way, a press die for molding that is free from the bent mountain shape of the corresponding portion could be made, and the sipe blade could be molded without any problems (a sipe blade in which the shape of the corresponding portion was plane with bent shape on both sides could be molded). The peripheral shape of the molded sipe blade was 15×60 mm. For one sipe blade, a three-dimensional molded shape was formed having 24 triangular bent mountains and 68 dimple mountains.

Example 3

Figure 23A:
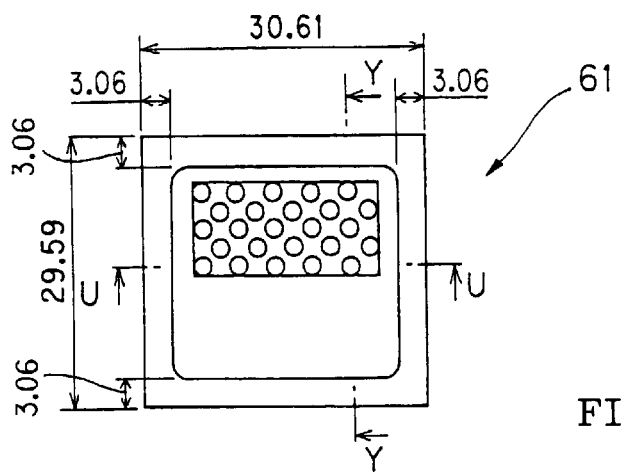
Figure 23C:
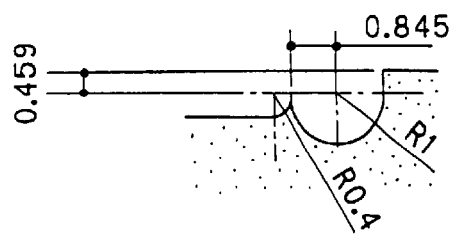
Figure 23B:
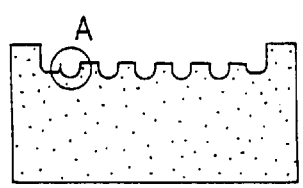
Figure 24A:
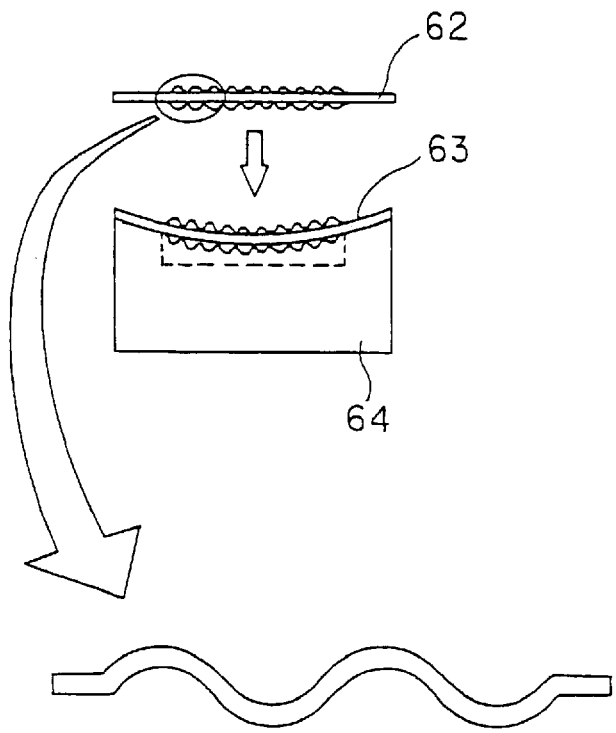
FIG. 24(a), FIG. 24(b) and FIG. 24(c) are explanatory and sectional views which schematically show a method for molding a second replica having both the primary molded shape and the secondary molded shape (the first shape and the second shape) according to another example of the method for making press die for molding the sipe blade of the present invention.
Figure 24B:
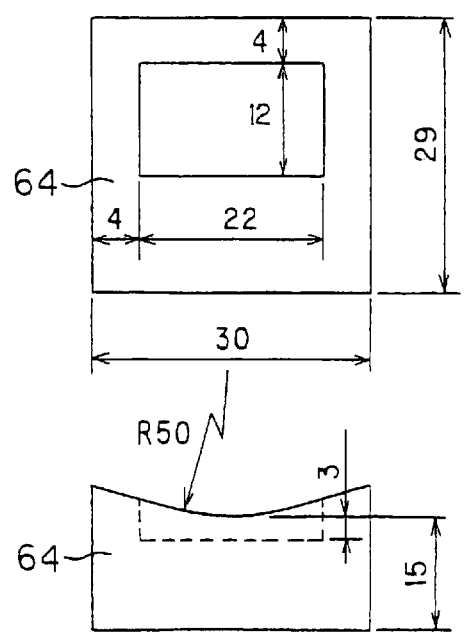
Figure 24C:
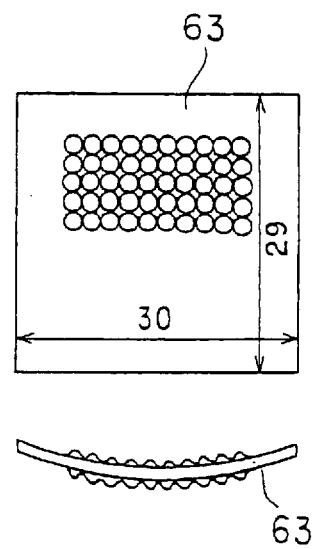

A pattern 61 for a press die having the primary molded shape (the first shape) as shown in FIGS. 23(*a*)–23(*c*) was prepared, and from the resulting pattern 61, two reversal molds of epoxy resin was produced. Using them, a first replica 62 made of sheet wax having a thickness of 0.3 mm as shown in FIG. 24(*a*) was molded, and re-bent using a bender 64 for the secondary molded shape (the second shape) as shown in FIG. 24(*b*) to mold a second replica 63 having both the primary molded shape and the secondary molded shape (the first shape and the second shape) as shown in FIG. 24 (*c*). From this second replica 63, a press die for molding was made by casting in the same manner as in Example 1 through the steps of FIG. 7(*g*) and the following.

When an SUS304 material of 0.3 mm in plate thickness was press molded using the above press die, a sipe blade of the desired shape could be obtained. Furthermore, when a tire was molded using the resulting sipe blade, a sipe of the same shape as of the second replica 63 could be formed in the tire. Due to the casting shrinkage of the press die, the size of the sipe blade was smaller by about 20/1000 than the second replica 63.

Example 4

Figure 25:
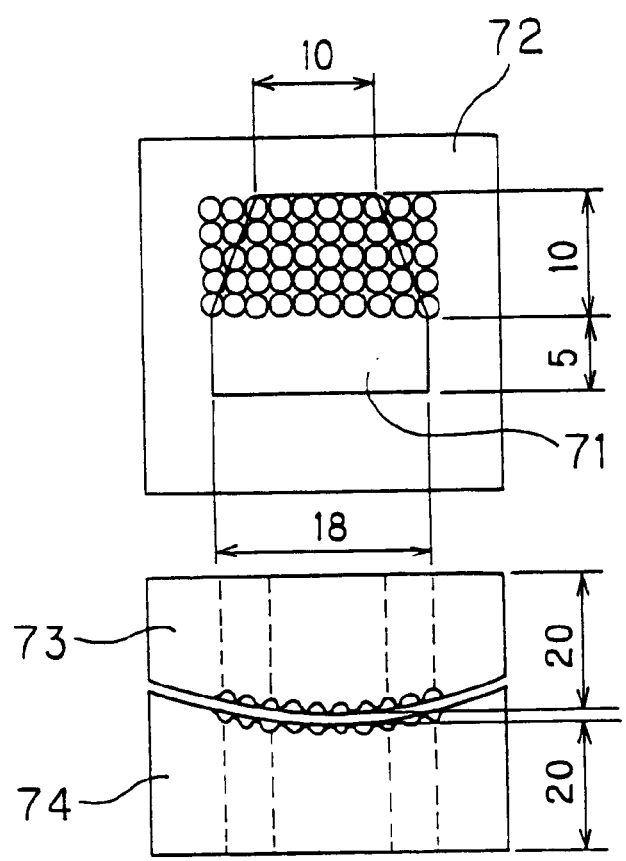
FIG. 25 is an explanatory sectional view which schematically shows one example of a method for making a trimming die for trimming a sipe blade of the present invention.

Two sets of press dies for molding having both the primary molded shape and the secondary molded shape (the first shape and the second shape) were made in the same manner as in Example 3, and from each of them, inner mold 71 and outer mold 72 as shown in FIG. 25 were cut out by wire electrical discharge machining. They were re-fabricated to make top and bottom trimming dies 73 and 74. The clearance between the top mold 73 and the bottom mold 74 was set at not more than 0.01 mm. When the sipe blade molded in Example 3 (SUS304 material of 0.3 mm in plate thickness) was subjected to trimming process by the top and bottom molds 73 and 74 made above, a sipe blade having the peripheral shape same as the shape of the mold could be obtained.

Example 5

A pattern 182 for a top mold and a pattern 183 for a bottom mold having the shape as shown in FIGS. 26(*a*)–26(*b*) and having a size of each part corresponding to the numerical value multiplied by 1/0.9800 were made by skiving a synthetic wood (chemiwood) by machining. The numerical values shown in FIGS. 26(*a*)–26(*b*) were the aimed size after casting. The reason for the multiplication by 1/0.9800 was for enlargement of size in the pattern for supplementing the shrinkage of 20/1000. Further, FIGS. 26(*c*)–26(*d*) are sectional views taken along the line I—I and the line J—J of FIGS. 26(*a*)–26(*b*), respectively.

Figure 27:
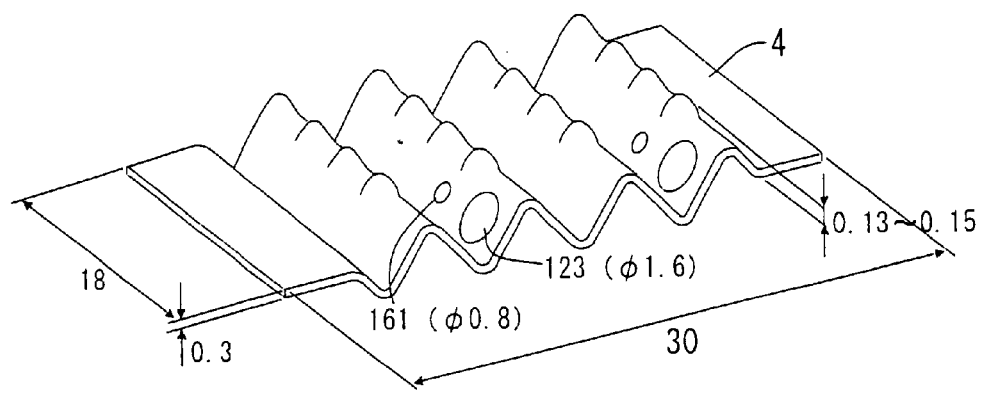
FIG. 27 is an oblique view which schematically shows a three-dimensional molded sipe blade made using the pattern for top mold and the pattern for bottom mold shown in FIGS. 26(a)–26(d).

From the thus obtained pattern 182 for the top mold and pattern 183 for the bottom mold, a press die for molding a sipe blade (a bending mold having a shape reverse to the shape of the pattern 182 for the top mold and the pattern 183 for the bottom mold) was completed in the same manner as in Example 1. Using this press die, SUS304 (stainless steel) of 0.3 mm thick was subjected to pressing under a pressure of 10 tons and as a result, there could be made a three-dimensional molded sipe blade 4 having both the corrugated two-dimensional molded shape as a primary molded shape and the fine protruded secondary molded shape in the portion of the mountain without causing scoring and tearing as shown in FIG. 27. The peripheral shape of the molded sipe blade was 18×30 mm.

Example 6

A pattern 182 for a top mold and a pattern 183 for a bottom mold having the shape as shown in FIGS. 28(*a*)–26

Figure 28A:
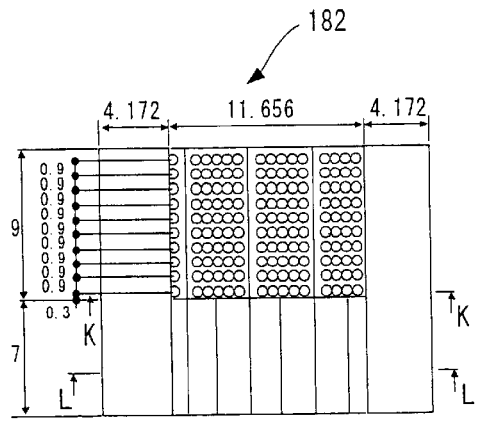
FIG. 28(a), FIG. 28(b), FIG. 28(c) and FIG. 28(d) are explanatory and sectional views which schematically show shapes of a pattern for top mold and a pattern for bottom mold according to another example of the method for making press die for molding the sipe blade of the present invention.
Figure 28B:
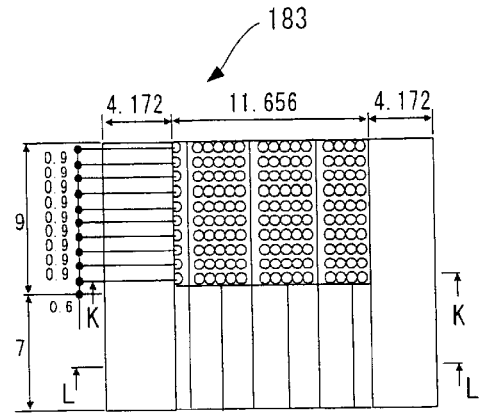
Figure 28C:
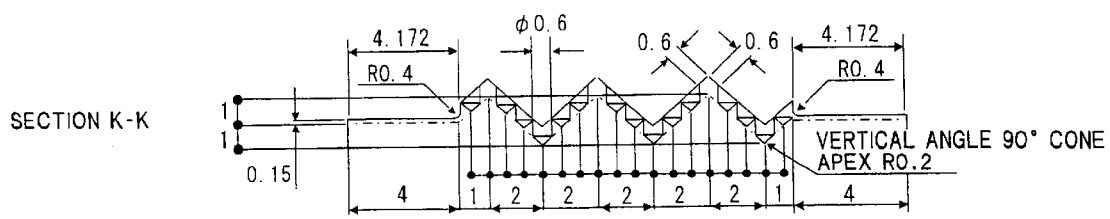
Figure 28D:
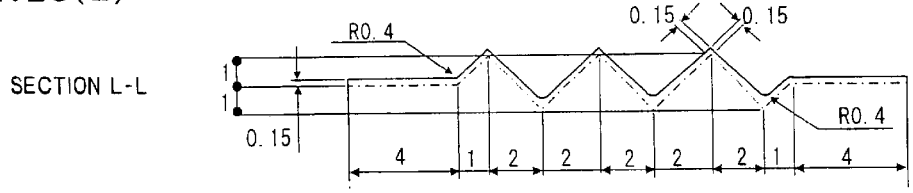

(b) and having a size of each part corresponding to the shown numerical value multiplied by 1/0.9800 were made by skiving a synthetic wood (chemiwood) by machining. The numerical values shown in FIGS. 28(a)–28(b) were the size aimed at after casting. The reason for the multiplication by 1/0.9800 was for enlargement of size in the pattern for supplementing the shrinkage of 20/1000. Further, FIGS. 28(c)–28(d) are sectional views taken along the line K—K and the line L—L of FIGS. 28(a)–28(b), respectively.

Figure 29:
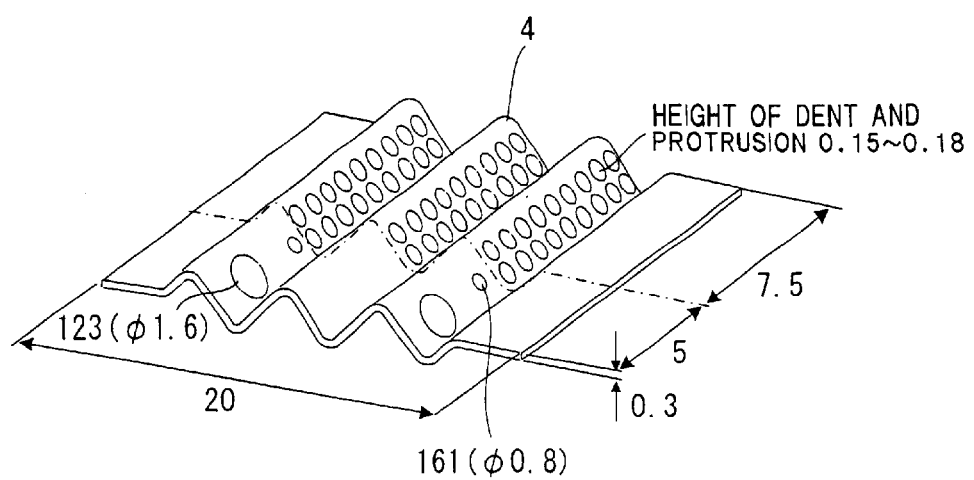
FIG. 29 is an oblique view which schematically shows a three-dimensionally molded sipe blade made using the pattern for top mold and the pattern for bottom mold shown in FIGS. 28 (a)–28 (d).

From the thus obtained pattern 182 for the top mold and pattern 183 for the bottom mold, a press die for molding a sipe blade (a press die having a shape reverse to the shape of the pattern 182 for the top mold and the pattern 183 for the bottom mold) was completed in the same manner as in Example 1. Using this press die, SUS304 (stainless steel) of 0.3 mm thick was subjected to pressing under a pressure of 10 tons and as a result, there could be made a three-dimensional molded sipe blade 4 having both the corrugated two-dimensional molded shape as a primary molded shape and the fine dented and protruded secondary molded shape in the portions of the mountain and the ridgeline without causing scoring and tearing as shown in FIG. 29. The peripheral shape of the molded sipe blade was 12.5×20 mm.

Example 7

A pattern 182 for a top mold and a pattern 183 for a bottom mold having the shape as shown in FIGS. 30(a)–30(b) and having a size of each part corresponding to the shown numerical value multiplied by 1/0.9800 were made by skiving a synthetic wood (chemiwood) by machining. The numerical values shown in FIGS. 30(a)–30(b) were the size aimed at after casting. The reason for the multiplication by 1/0.9800 was for enlargement of size in the pattern for supplementing the shrinkage of 20/1000. Further, FIGS. 30(c)–30(d) are sectional views taken along the line M—M, the line N—N and the line O—O of FIGS. 30(a)–30(b), respectively.

Figure 31:
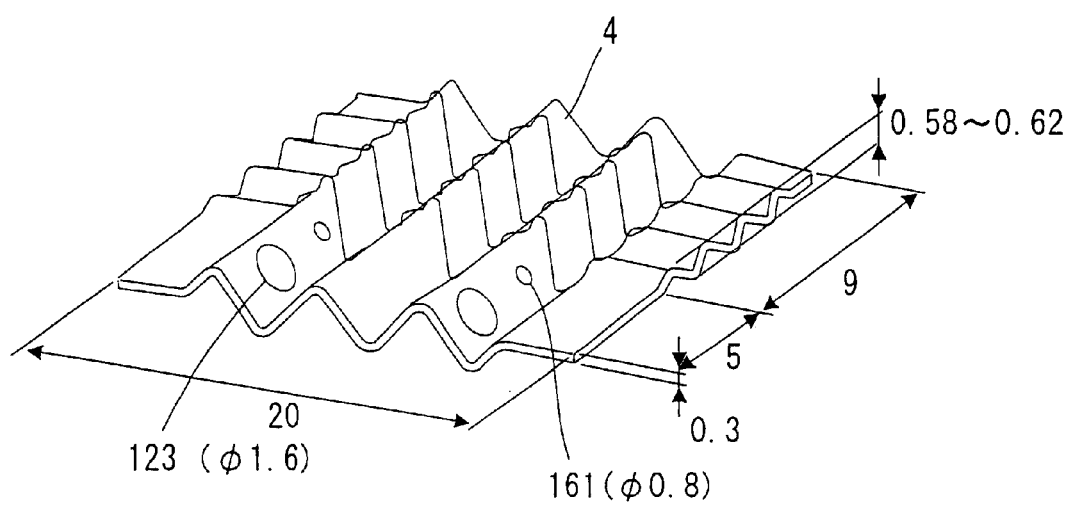
FIG. 31 is an oblique view which schematically shows a three-dimensionally molded sipe blade made using the pattern for top mold and the pattern for bottom mold shown in FIGS. 30(a)–30(f).
Figure 33:
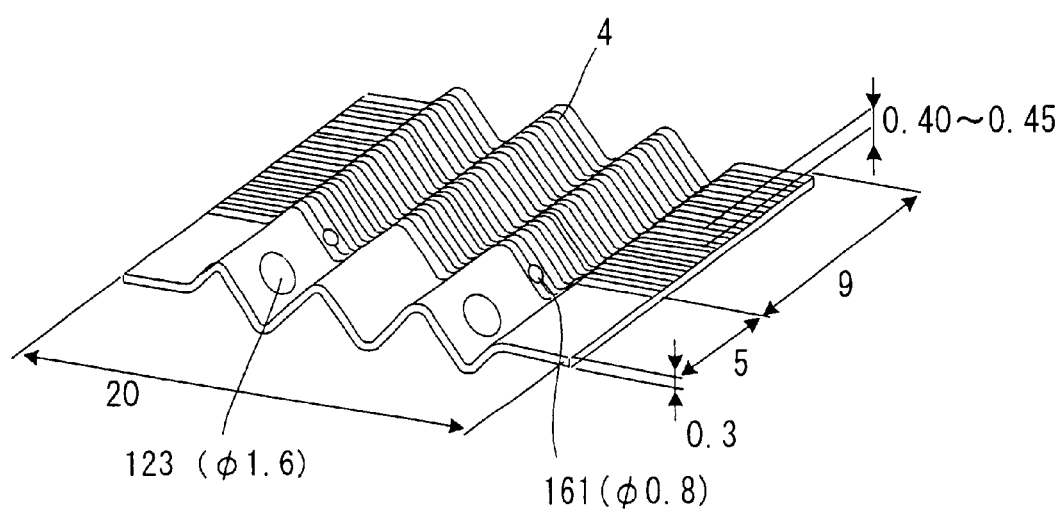
FIG. 33 is an oblique view which schematically shows a three-dimensionally molded sipe blade made using the pattern for top mold and the pattern for bottom mold shown in FIGS. 32(a)–32(e).

From the thus obtained pattern 182 for the top mold and pattern 183 for the bottom mold, a press die for molding a sipe blade (a press die having a shape reverse to the shape of the pattern 182 for the top mold and the pattern 183 for the bottom mold) was completed in the same manner as in Example 1. Using this press die, SUS304 (stainless steel) of 0.3 mm thick was subjected to pressing under a pressure of 10 tons and as a result, there could be made a three-dimensional molded sipe blade 4 having the corrugated two-dimensional molded shape as a primary molded shape and the dented and protruded secondary molded shape obliquely crossing the corrugated shape without causing scoring and tearing as shown in FIG. 31. The peripheral shape of the molded sipe blade was 14×20 mm.

Example 8

A pattern 182 for a top mold and a pattern 183 for a bottom mold having the shape as shown in FIGS. 32(a)–32(b) and having a size of each part corresponding to the shown numerical value multiplied by 1/0.9800 were made by skiving a synthetic wood (chemiwood) by machining. The numerical values shown in FIGS. 32(a)–32(b) were the size aimed at after casting. The reason for the multiplication by 1/0.9800 was for enlargement of size in the pattern for supplementing the shrinkage of 20/1000. Further, in FIGS. 32(a)–32(b), there are shown sectional views taken along the line S—S and the line T—T. FIG. 32(c) is a sectional view taken along the line U—U of FIGS. 32(a)–32(b). FIGS. 32(d)–32(e) are enlarged views of the section H and the section I.

From the thus obtained pattern 182 for the top mold and pattern 183 for the bottom mold, a press die for molding sipe blade (a press die having a shape reverse to the shape of the pattern 182 for top mold and the pattern 183 for bottom mold) was completed in the same manner as in Example 1. Using this press die, SUS304 (stainless steel) of 0.3 mm thick was subjected to pressing under a pressure of 10 tons and as a result, there could be made a three-dimensional molded sipe blade 4 having the corrugated two-dimensional molded shape as a primary molded shape and the mark-off line-like dented and protruded secondary molded shape crossing at right angles to the corrugated shape without causing scoring and tearing as shown in FIG. 31. The peripheral shape of the molded sipe blade was 14×20 mm.

Example 9

Figure 34A:
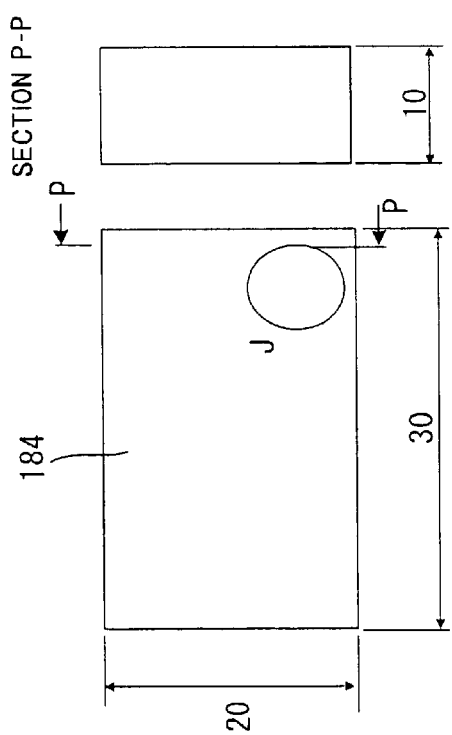
FIG. 34(a), FIG. 34(b) and FIG. 34(c) are explanatory and sectional views which schematically show a pattern for changing plate thickness (common use for top and bottom molds) and shape of engagement of top and bottom molds of press metal mold for changing of plate thickness in another example of the method for making press die for molding the sipe blade of the present invention.
Figure 34B:
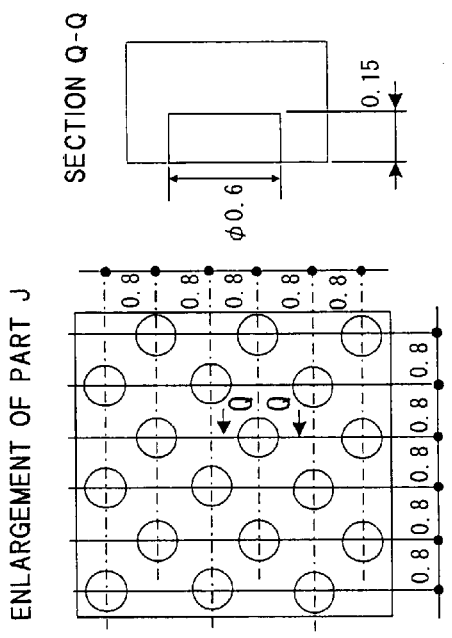
Figure 34C:
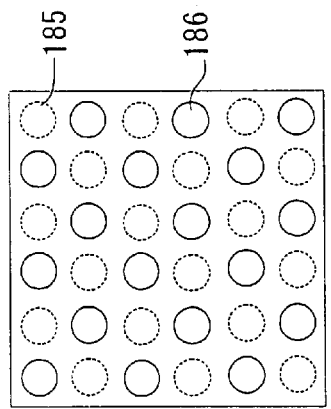

A pattern 184 for changing the plate thickness (commonly used for top and bottom molds) having the shape as shown in FIG. 34(a) and having a size of each part corresponding to the shown numerical value multiplied by 1/0.9800 was made by skiving a square material from an aluminum alloy material (material of JIS A5052) by machining and locally dissolving out the surface of the square material by chemical etching (a masking tape having openings of the corresponding design was applied to the surface of the square material, followed by etching with an aqueous hydrogen fluoride solution). In FIG. 34(a), a sectional view taken along the line P—P is shown. FIG. 34(b) is an enlarged view of the section J. FIG. 34(b) shows a sectional view taken along the line Q—Q. From the thus obtained pattern 184 for changing the plate thickness (commonly used for top and bottom molds), a press die for changing of plate thickness was made in the same manner as in Example 1.

The engagement of the top and bottom molds of the press die was zigzag as shown in FIG. 34(b), and the protruded portions of 0.6 mmφ in diameter and 0.15 mm in height were engaged. Using this press die, a plane material was used in pressing in Examples 5–7 and was preliminarily molded under a pressure of 15 tons, and thereafter press molded by the press molds made in the above examples. As a result, dented and protruded shapes (protrusion 185 of the top mold and protrusion 186 of the bottom mold) of about 0.05–0.10 mm at plate thickness level could be imparted to the sipe blades 4 of three-dimensional molded shape of Examples 5–7 at a pitch of 0.8 mm (namely, a three-dimensional molded shape could be imparted).

Example 10

Figure 35:
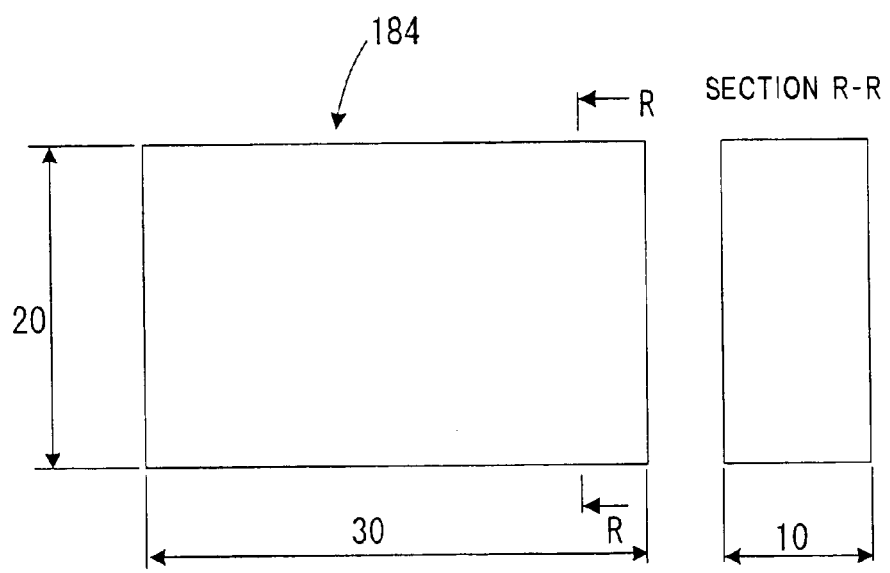
FIG. 35 is an explanatory and sectional view which schematically shows the shape of the pattern for changing of plate thickness (common use for top and bottom molds) in another example of the method for making press die for molding the sipe blade of the present invention.
Figure 36:
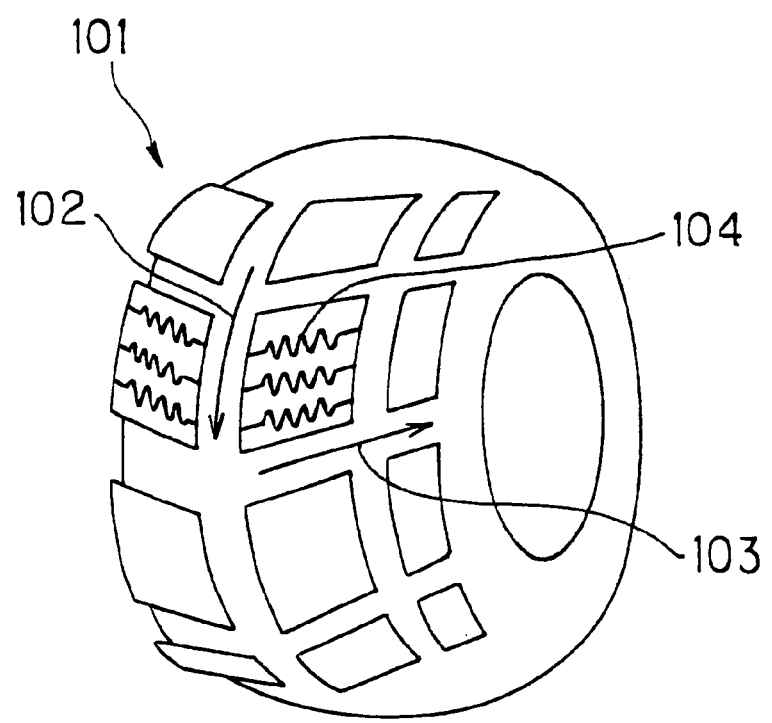
FIG. 36 is an oblique view which schematically shows shapes of various grooves disposed at a tire.
Figures 39A, 39B, 39C:
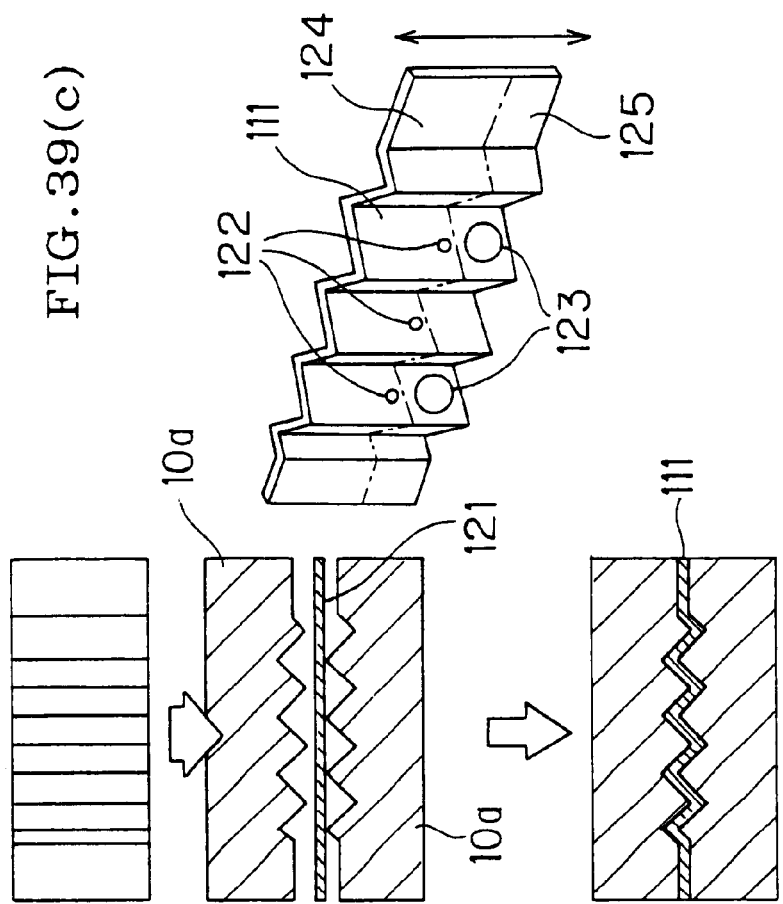
FIG. 39(a), FIG. 39(b), and FIG. 39(c) are sectional and oblique views which schematically show a method for making a sipe blade in the conventional method for making a tire shown in FIGS. 38(a)–38(e) and one example of the sipe blade obtained.
Figure 41A:
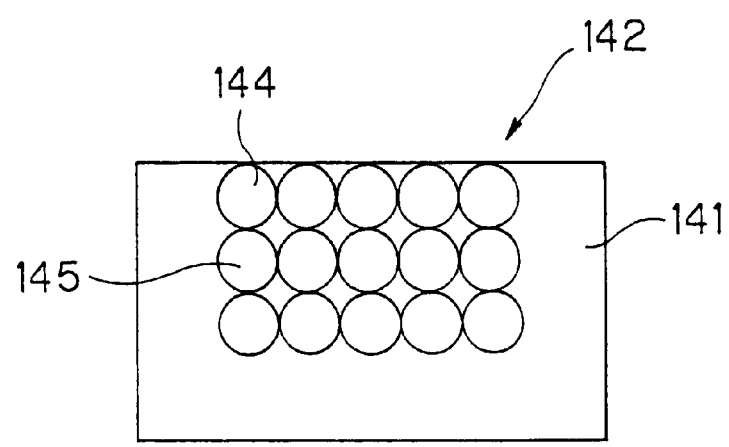
FIG. 41(a) and FIG. 41(b) show a sectional and sectional view which schematically shows that, according to the conventional method for making a press die for molding a sipe blade, it is difficult to mold a press die for molding which has both the primary molded shape and the secondary molded shape.
Figure 41B:
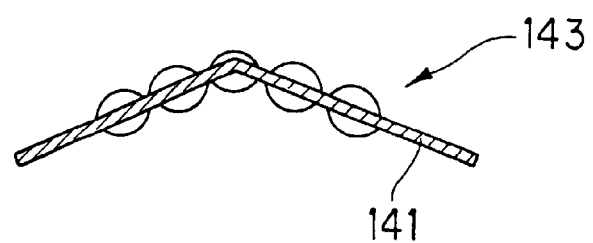
Figure 42A:
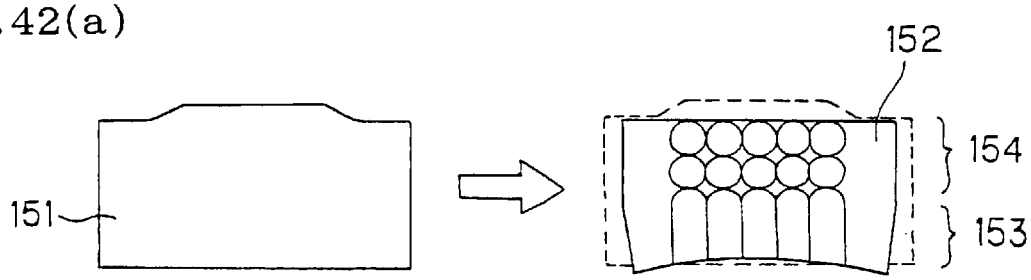
FIG. 42(a), FIG. 42(b) and FIG. 42(c) are explanatory views which schematically show the reason for the occurrence of distortion phenomenon in the sipe blade in the conventional press die for molding of sipe blade.
Figure 42B:
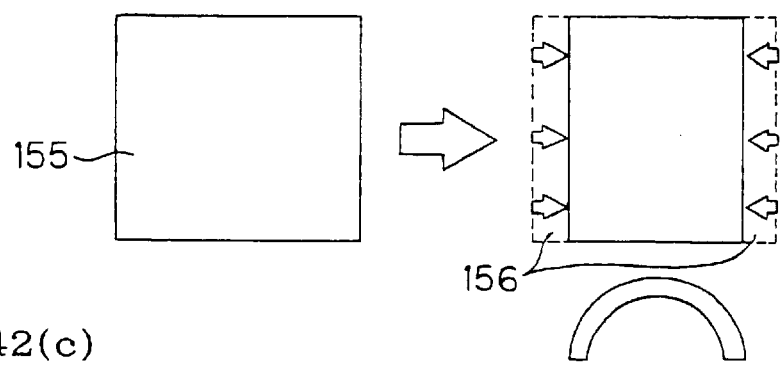
Figure 42C:
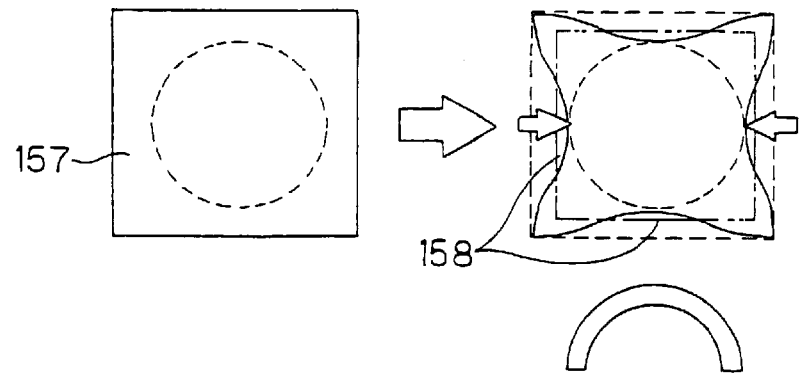
Figure 43A:
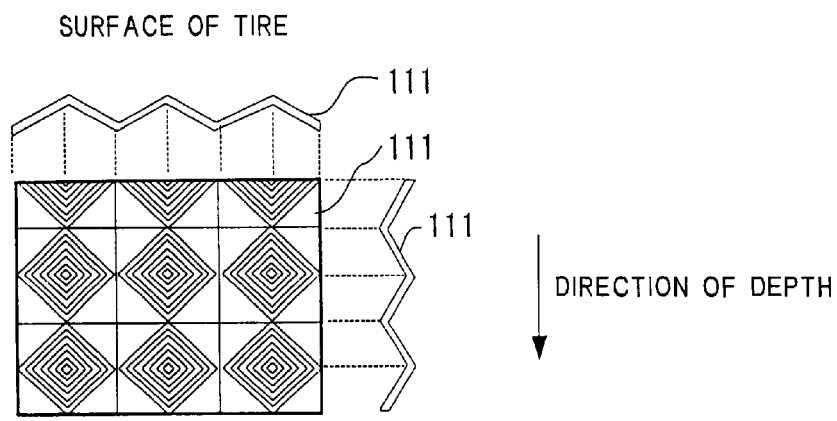
FIG. 43(a) and FIG. 43(b) show an explanatory and a sectional view which schematically show one example of a sipe blade for a conventional tire mold having a three-dimensional molded shape.
Figure 43B:
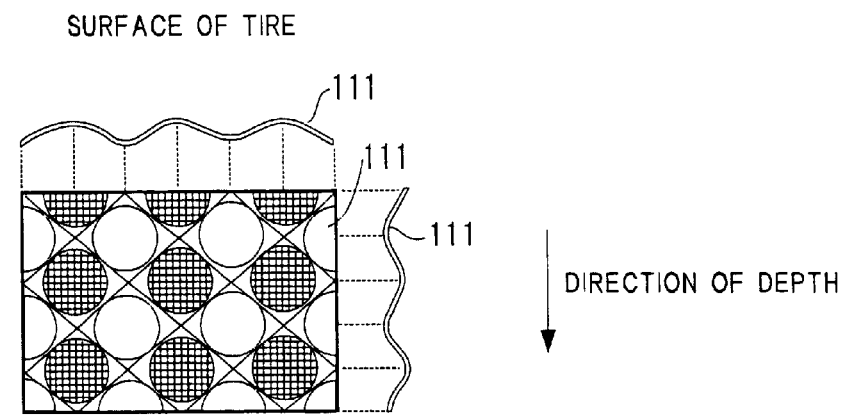
Figure 44A:
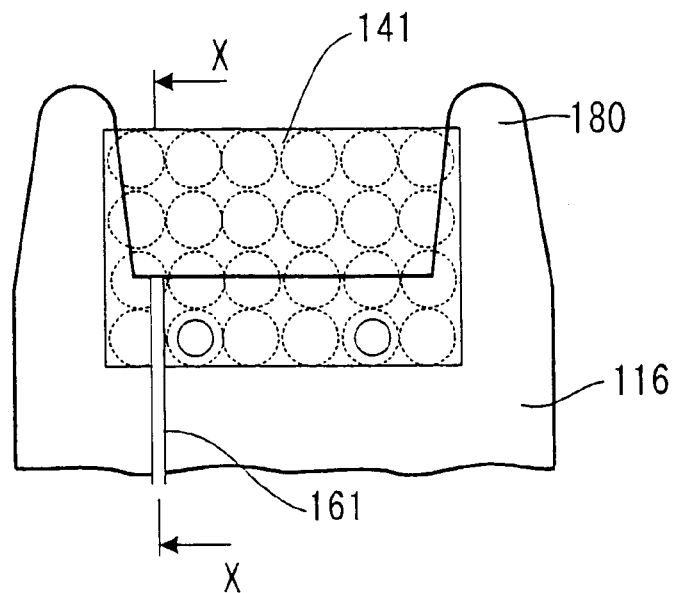
FIG. 44(a) and FIG. 44(b) are sectional views which schematically show that the sipe blade for a tire mold shown in FIGS. 43(a)–43(b) is apt to interfere at the time of working of vent holes in the tire mold.
Figure 44B:
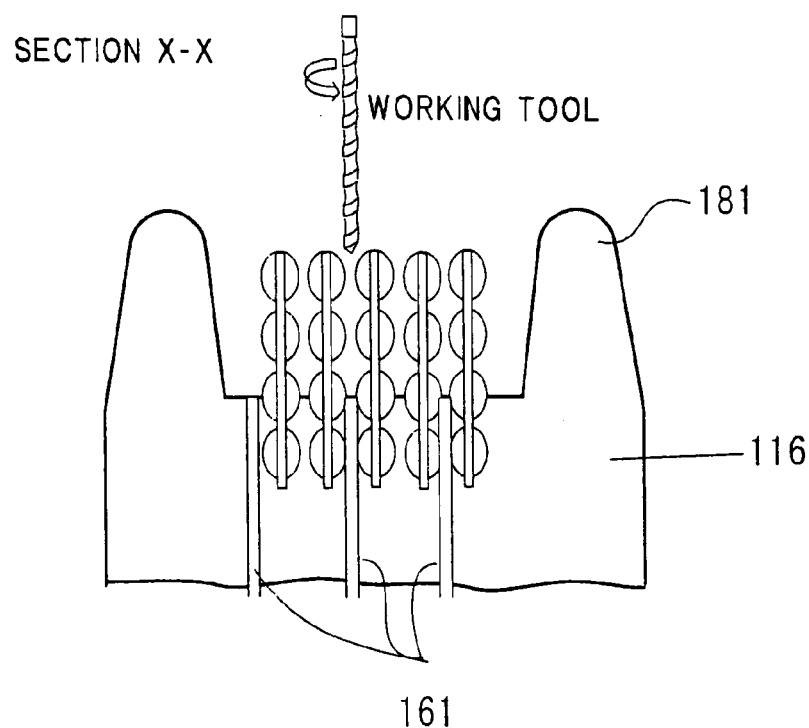
Figure 45:
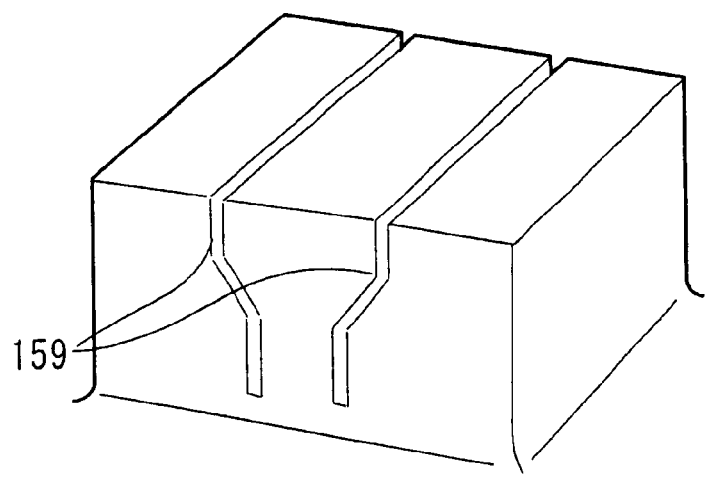
FIG. 45 is an oblique view which schematically shows a crank molded shape according to another example of the sipe blade for a tire mold having a three-dimensional molded shape.
Figure 46:
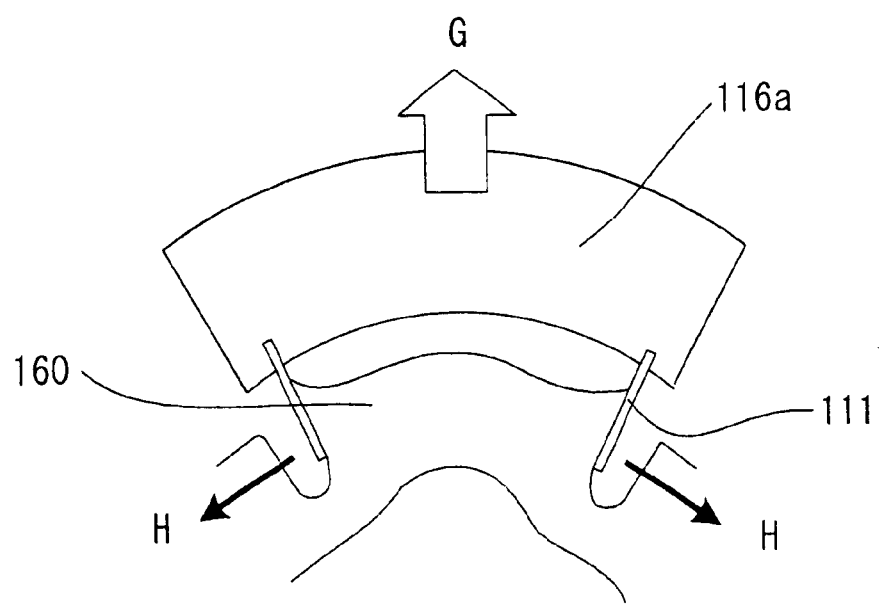
FIG. 46 is a sectional view which schematically shows that a large bending load acts on the tire mold, especially, the sipe blade at the time of molding of tire.
Figure 47A:
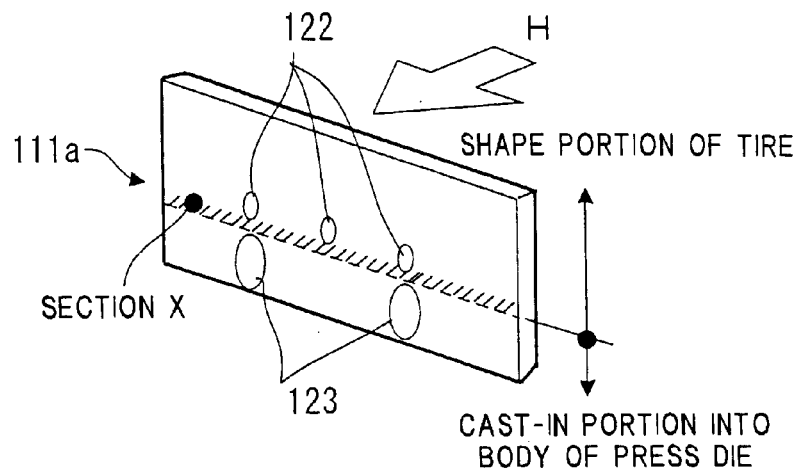
FIG. 47(a) and FIG. 47(b) are oblique views which schematically show that, in the case of sipe blades having the same plate thickness, the maximum bending stress becomes smaller with larger section modulus.
Figure 47B:
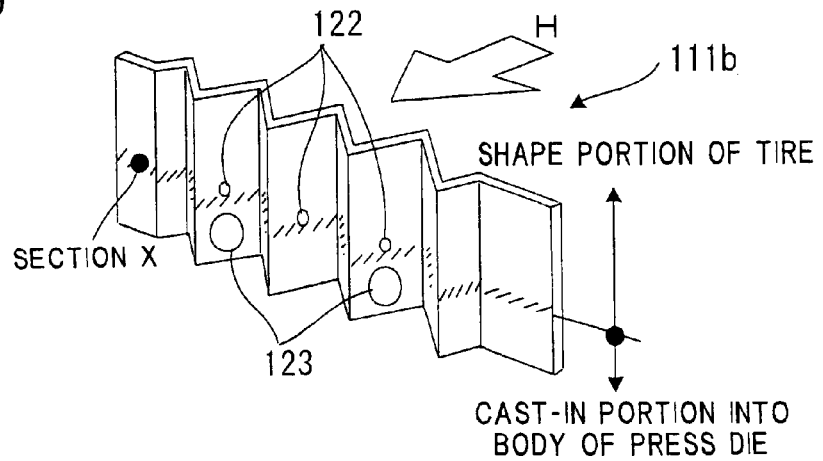
Figure 48A:
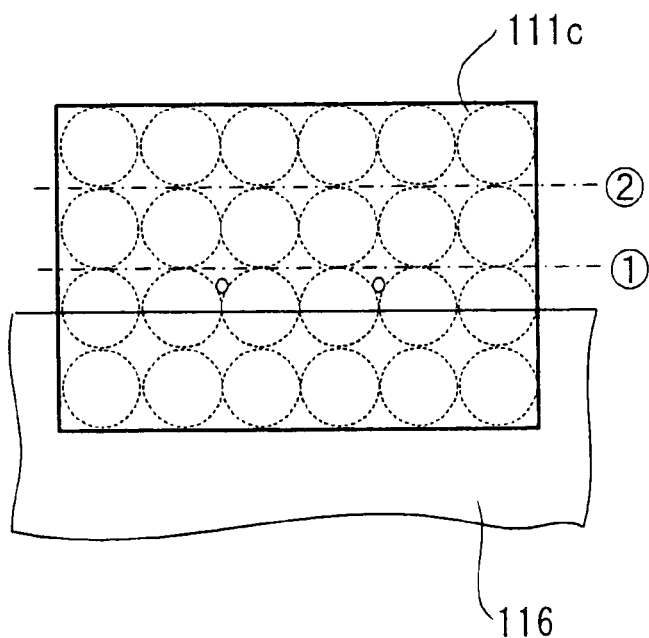
FIG. 48(a) and FIG. 48(b) are explanatory and sectional views which schematically show that, in the case of a sipe blade for a tire mold having three-dimensional molded shape, there is a portion of small section modulus.
Figure 48B:
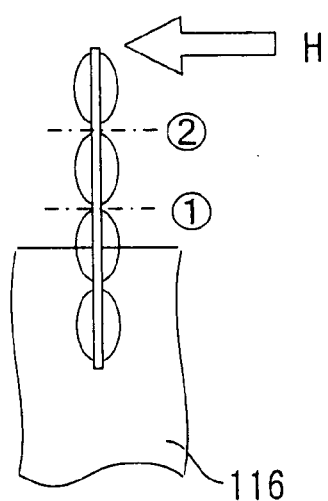
Figure 49A:
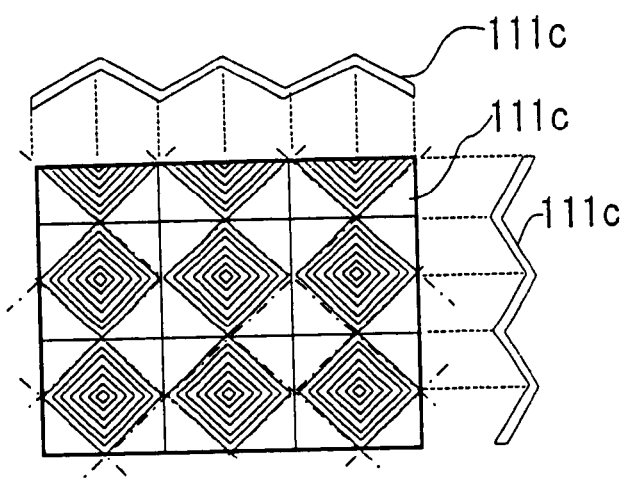
FIG. 49(a) and FIG. 49(b) are an explanatory view and a sectional view which schematically show that there is a portion of small section modulus in another example of the conventional sipe blade for a tire mold having three-dimensional molded shape.
Figure 49B:
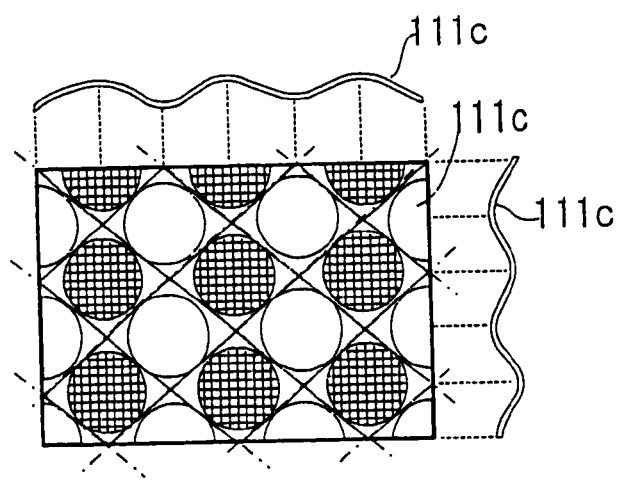

A pattern 184 for changing the plate thickness (commonly used for top and bottom molds) having the shape as shown in FIG. 35 was made by skiving from a material of G-1 foamed gypsum (water content 65%, foaming rate 50%, manufactured by Noritake Gypsum Co., Ltd.) in the state of free water being removed. The surface of this pattern 184 for changing the plate thickness was in such a state that innumerable foams of about 0.02–0.3 mm in diameterφ were exposed. FIG. 35 shows a sectional view taken along the line R—R.

Using this pattern 184 for changing the plate thickness, a press die for changing the plate thickness was made in the same manner as in Example 1. In this case, at the stage of a rubber mold made by reversing the pattern 184 for changing the plate thickness, spherical protrusions present on the surface of the rubber mold which had a diameterφ of about 0.1–0.2 mm or more were removed.

Using this press die, a plane material was used in pressing in Examples 5–7 and was preliminarily molded under a pressure of 15 tons, and thereafter press molded by the press dies made in the above examples. As a result, dented and protruded shapes of about 0.02–0.10 mm at plate thickness level could be imparted to the sipe blades 4 of three-dimensional molded shape of Examples 5–7 at random (namely, a three-dimensional molded shape could be imparted).

As explained above, the present invention provides a press die for molding a sipe blade according to which a sipe blade having complicated shape (i.e., a three-dimensional shape) which has excellent mechanical strength characteristics can be efficiently molded, and, further, production cost can be reduced with a simple structure. The present invention further provides a method for making a press die for molding a sipe blade according to which a sipe blade having complicated shape (i.e., a three-dimensional shape) can be simply and efficiently made by a casting method.

What is claimed is:

1. A method for making a press die for molding a sipe blade, said press die comprising a pair of divided parts between which a material for the sipe blade is interposed and pressed to mold the sipe blade into a desired shape, said method comprising the steps of:

forming first a pattern mold for each said pair of divided parts having a shape that is the reverse of the shape of a respective one of said pair of divided parts; and forming a metal casting from each said pattern mold, each said metal casting having a shape that is the reverse of the shape of a respective one of said pattern molds;

wherein each said pattern mold includes a first portion that corresponds to a first portion of said metal casting to which a load is applied by molding pressure in contact with the material for the sipe blade, said first portion of said metal casting having a shape corresponding to the desired shape of the sipe blade; and wherein each said pattern mold includes a second portion that corresponds to a second portion of said metal casting to which a load is not applied by molding pressure, and wherein said second portion of said pattern mold includes a first relief portion that does not correspond to the desired shape of the sipe blade and that does not substantially contact the sipe blade.

2. The method of claim 1, wherein said pattern molds are formed by a machining method and said metal castings are formed from said pattern molds by a casting method.

3. The method of claim 1, wherein said first relief portion comprises a groove having a depth that is equal to or greater than a height of said first portion of said pattern mold on an opposing one of said pair of divided parts and wherein said first relief portion has a bottom surface that is horizontal to a surface of the material for the sipe blade.

4. The method of claim 1, wherein said first portions of said pattern mold and said metal casting have a protruded shape and said second portions of said pattern mold and said metal casting have a dented shape so as to provide a three-dimensionally dented and protruded shape to said pair of divided parts according to the desired shape of the sipe blade.

5. The method of claim 4, wherein a plurality of said first portions of said pattern mold and said metal casting are provided and wherein apexes of said first portions of said pattern mold and said metal casting are simultaneously disposed such that a curved base formed by connecting said apexes forms a primary molded shape to provide a three-dimensionally dented and protruded shape to said pair of divided parts in correspondence to the desired shape of the sipe blade.

6. The method of claim 1, wherein each said pattern mold comprises a plurality of previously prepared pattern parts having a plurality of different shapes for providing the desired shape of the sipe blade, such that a plurality of different sipe blades having a plurality of different shapes can be provided when said pattern parts are combined in different combinations to form said pattern mold.

7. The method of claim 1, wherein said pattern mold comprises a plurality of discontinuous, individual parts, and wherein a second relief portion is formed at an intermediate position between said individual parts such that said second relief portion does not substantially contact the material for the sipe blade.

8. The method of claim 1, further comprising the steps of:

forming a pair of first reversal molds each having a shape that is the reverse of the shape of a respective one of said pattern molds;

forming a first sipe blade replica comprising an easily moldable material from said first reversal molds such that said first sipe blade replica has a first shape, said first shape corresponding to said shape of said first reversal mold and further comprising a plurality of dented and protruded portions;

forming a second sipe blade replica from said first sipe blade replica by imparting a second shape to said first sipe blade replica using a secondary mold, such that said second sipe blade replica has both said first shape and said second shape;

forming a pair of second reversal molds from said second sipe blade replica such that said second reversal molds have a shape that is the reverse of the shape of said second sipe blade replica; and forming a metal casting from said second reversal molds using a casting method such that each said metal casting has both said first shape and said second shape.

9. The method of claim 8, wherein said easily moldable material comprises sheet wax.

10. The method of claim 8, further comprising the steps of:

forming a pair of second pattern molds by filling dented portions of said second reversal molds with a filler material to define a planar surface; and forming a metal casting from said second pattern molds using a casting method such that each said metal casting has a shape that is reverse of the shape of a respective one of said second pattern molds and such that each said metal casting has fewer protruded shapes than the number of dented shapes of a respective one of said second reversal molds.

11. A method for making a metal trimming die for trimming a sipe blade, comprising the steps of:

providing at least one of said pattern molds, said first reversal molds and said secondary mold of claim 8, forming a third sipe blade replica comprising an easily moldable material from at least one of said pattern molds, said first reversal molds and said secondary mold such that said third sipe blade replica is larger than the sipe blade;

forming a pair of third reversal molds from said third sipe blade replica; and forming said metal trimming die by casting a metal in said third reversal molds.

12. The method of claim 1 further comprising the steps of:

forming a pair of second pattern molds by filling dented portions of a dented and protruded shape provided in said first pattern molds with a filler material to define a planar surface; and forming a metal casting from said second pattern molds using a casting method such that each said metal casting has a shape that is the reverse of the shape of a respective one of said second pattern molds and such that each said metal casting has fewer protruded shapes than the number of said dented portions provided in a respective one of said first pattern molds.

13. A method for making a press die for molding a sipe blade, said press die comprising a pair of divided parts between which a material for the sipe blade is interposed and pressed to mold the sipe blade into a desired shape, said method comprising the steps of:

forming a pattern mold for each said pair of divided parts having a shape that is the reverse of the shape of a respective one of said pair of divided parts, each said pattern mold including a primary shape;

forming a dented and protruded shape in said primary shape of said pattern molds using a cutter mark in a chemical molding method, a physical corrosion method or a machining method; and forming a metal casting from said pattern molds, each said metal casting having a shape that is the reverse of the shape of a respective one of said pattern molds;

wherein each said metal casting has a three-dimensional shape including said primary shape provided with said dented and protruded shape.

14. The method of claim 13, wherein said chemical molding method comprises a chemical etching method.

15. A method for making a press die for molding a sipe blade, said press die comprising a pair of divided parts between which a material for the sipe blade is interposed and pressed to mold the sipe blade into a desired shape, said method comprising the steps of:

forming a pattern mold for each said pair of divided parts having a shape that is the reverse of the shape of a respective one of said pair of divided parts, each said pattern mold comprising a porous material having a primary shape;

forming a dented and protruded shape in said primary shape of said pattern molds by a machining method; and forming a metal casting from said pattern molds, each said metal casting having a shape that is the reverse of the shape of a respective one of said pattern molds;

wherein each said metal casting has a three-dimensional shape including said primary shape provided with said dented and protruded shape.

* * * * *